US006725251B2

United States Patent
Ito et al.

(10) Patent No.: US 6,725,251 B2
(45) Date of Patent: Apr. 20, 2004

(54) LOCAL-FILE-TRANSFER METHOD AND LOCAL-FILED-TRANSFER SYSTEM FOR CLIENT-SERVER SYSTEM

(75) Inventors: Tatsuya Ito, Kawasaki (JP); Shin Miyazawa, Kawasaki (JP); Nobuhiro Nakaya, Kawasaki (JP); Masahito Kawai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/818,436

(22) Filed: Mar. 17, 1997

(65) Prior Publication Data

US 2002/0059360 A1 May 16, 2002

(30) Foreign Application Priority Data

Mar. 29, 1996 (JP) .............................. 8-077939

(51) Int. Cl.⁷ ................................................ G06I 15/16
(52) U.S. Cl. ........................... 709/203; 709/203; 707/5
(58) Field of Search ..................... 395/200.33, 200.3, 395/610, 200.57, 182.18, 604, 605; 345/348; 382/54, 305; 364/200; 379/201; 705/1; 709/217, 201, 219, 227; 707/3, 2, 1, 4, 5, 10, 6, 501, 103, 104, 102, 200

(56) References Cited

U.S. PATENT DOCUMENTS

| | | | | |
|---|---|---|---|---|
| 4,751,635 A | * | 6/1988 | Kret ............................ 364/200 |
| 5,201,048 A | * | 4/1993 | Coulter et al. .................. 707/3 |
| 5,333,251 A | * | 7/1994 | Urabe et al. .................... 707/3 |
| 5,454,105 A | * | 9/1995 | Hatakeyama et al. .......... 707/2 |
| 5,469,354 A | * | 11/1995 | Hatakeyama et al. .. 364/419.19 |
| 5,521,597 A | * | 5/1996 | Dimitri ......................... 341/51 |
| 5,522,041 A | * | 5/1996 | Murakami et al. ..... 395/200.01 |
| 5,560,005 A | * | 9/1996 | Hoover et al. ................. 707/10 |
| 5,586,316 A | * | 12/1996 | Tanaka et al. ............... 395/604 |
| 5,590,319 A | * | 12/1996 | Cohen et al. .................. 7097/4 |
| 5,608,900 A | * | 3/1997 | Dockter et al. ............. 707/102 |
| 5,634,051 A | * | 5/1997 | Thomson ....................... 707/5 |
| 5,644,720 A | * | 7/1997 | Boll et al. .................... 709/227 |
| 5,686,954 A | * | 11/1997 | Yoshinobu et al. ........... 725/43 |
| 5,694,593 A | * | 12/1997 | Baclawski ................... 395/605 |
| 5,715,443 A | * | 2/1998 | Yanagihara et al. ........ 395/603 |
| 5,737,533 A | * | 4/1998 | de Hond ..................... 709/219 |
| 5,737,734 A | * | 4/1998 | Schultz .......................... 707/5 |
| 5,740,362 A | * | 4/1998 | Buickel et al. ............. 709/201 |
| 5,742,817 A | * | 4/1998 | Pinkoski ..................... 707/200 |
| 5,757,983 A | * | 5/1998 | Kawaguchi et al. ........ 382/305 |
| 5,758,324 A | * | 5/1998 | Hartman et al. ............... 705/1 |
| 5,768,581 A | * | 6/1998 | Cochran ........................ 707/5 |

(List continued on next page.)

OTHER PUBLICATIONS

Extension of the Integrated Database "HyperGenome" for Genome..—Susumu Goto ; www.genome.ad.jp/manu-scripts/GIW94/WS/GIW94W05.ps.*

(List continued on next page.)

Primary Examiner—Jack B. Harvey
Assistant Examiner—Thong Vu
(74) Attorney, Agent, or Firm—Staas & Halsey LLP

(57) ABSTRACT

A WWW client-server system is provided with a local-file-transfer method and a local-file-transfer system which achieve significant reduction in operator work load in comparison with conventional keyboard entry. According to the present invention, lengthy data, which is not suitable for keyboard data entry, is stored as a file in the client device in advance, and is transferred to the server device at the time of search. The server device carries out the search for requested information based on the transferred file data. Furthermore, a search query can be constructed at the client based on combined search conditions made up from search-condition file names and search condition data previously transferred to the server.

38 Claims, 18 Drawing Sheets

U.S. PATENT DOCUMENTS

| | | | | |
|---|---|---|---|---|
| 5,778,368 A | * | 7/1998 | Hogan et al. | 707/10 |
| 5,801,689 A | * | 9/1998 | Huntsman | 707/5 |
| 5,802,493 A | * | 9/1998 | Sheflott et al. | 705/1 |
| 5,812,998 A | * | 9/1998 | Tsutsumi et al. | 707/2 |
| 5,813,014 A | * | 9/1998 | Gustman | 707/103 |
| 5,819,261 A | * | 10/1998 | Takahashi et al. | 707/3 |
| 5,848,410 A | * | 12/1998 | Walls et al. | 707/4 |
| 5,850,433 A | * | 12/1998 | Rondeau | 379/201 |
| 5,864,863 A | * | 1/1999 | Burrows | 707/103 |
| 5,873,076 A | * | 2/1999 | Barr et al. | 707/3 |
| 5,873,077 A | * | 2/1999 | Kanoh et al. | 707/3 |
| 5,884,309 A | * | 3/1999 | Vanechanos, Jr. | 707/10 |
| 5,907,837 A | * | 5/1999 | Ferrel et al. | 707/3 |
| 5,930,474 A | * | 7/1999 | Dunworth et al. | 709/217 |
| 6,026,388 A | * | 2/2000 | Liddy et al. | 707/1 |
| 6,131,092 A | * | 10/2000 | Masand | 707/6 |

OTHER PUBLICATIONS

Building a Laboratory Information System around a C++–Based..—Nathan Goodman (1994) ; www.genome.wi.mit.edu/ftp/pub/papers/Y1994/building.ps.Z.*

The Internet way to do homework. http://ajax.prenhall.com/division/ptr/..assroom_connect/kids/homework/ch02.*

The World Wide Web Encyclopedia–String;Search String; http://mail.investbank.com.ua/encyclop/_stri001 & sear003.*

The NASA report Technical Report Server. http://techreports.larc.nasa.gov/ltrs/papaers/NASA–95–ir–p25/NASA–95–ir–p25.*

* cited by examiner

FIG. 11

―――― DIRECTORY ―――― ances
begin           FILEA

>hpcpolp sequence 1
gccgaagcgaagaacatcagcaccggccacacggcgaccaacgactgcaccaatgatagc
accacccggcaactccaggccgctgcccccacgcccccgggcgcgccccgcgcgagaaa
cactggggcgtcatgctcggcttagcctactcctctacgcagggagcatgggcaaaagcc
gtcgtcatcctttcgctggccgccggggcggacgcg
//

FILEB

>hpchcj1 sequence 2
caccaagcgcgcaactccacagggctttatcacgtcaccaatgactgccctaacccgagt
atcgtgcacgaggcgcacgacgccaccctgcacaccccggggcgtgtcccttgcgttagc
cactggggagtcctggcgggcatagcatattcctccacggcgggaaactgggcgaaggcc
ctggtagtgctgtcgctgtttgccggcgccgacgcg
//

FILEC

>hpcj491 sequence 3
tatgaagtgcgcaacgtgtcagggatataccatgtcacgaacgactgctccgactcaage
atcgtgtatgaggcagcggacgtgatcatgcatactacagggtgcgtgccctgtgttcgg
cactggggagtcctggcgggccttgcctactattacatggtagggaactgggctaaggtt
ccgaccgtgccgctcctctttgccggcgttgacggg
//

FIG. 12

>hpcpolp sequence 1
gccgaagcgaagaacatcagcaccggccacacggcgaccaacgactgcaccaatgatagc
accacccggcaactccaggccgctgcccccacgcccccgggcgcgccccgcgcgagaaa
cactggggcgtcatgctcggcttagcctactcctctacgcagggagcatgggcaaaagcc
gtcgtcatcctttcgctggccgccggggcggacgcg
//

>hpchcj1 sequence 2
caccaagcgcgcaactccacagggctttatcacgtcaccaatgactgccctaacccgagt
atcgtgcacgaggcgcacgacgccaccctgcacaccccggggcgtgtcccttgcgttagc
cactggggagtcctggcgggcatagcatattcctccacggcgggaaactgggcgaaggcc
ctggtagtgctgtcgctgtttgccggcgccgacgcg
//

FIG. 16

Result:
0:     HPCPCLP   sequence  1
1:     HPCHCJ1   sequence  2

RELATIONSHIP BETWEEN PAIRS OF SEQUENCES:
    lower triangle distance between pairs
    upper triangle percent homology in alignment
          0      1

0           62
    1   -1 weight of insertion-deletion of length k: 7 - k*3
number of sequences: 2
total number of pairwise comparisons used: 1
218 is the total length of alignment

TABLES OF GENETIC EVENTS:

lower triangle:symmetrised substitutions
    upper triangle:mutation distance matrix

```
      A   C   G   T   U   R   Y   M   K   S   W   E   B   Y
  A       5   2   5   5   0   5   0   2   2   0   0   2   0
  C 11        5   2   2   5   0   0   2   0   2   0   0   0
  G 14  19       5   5   0   5   2   0   0   2   2   0   0
  T  6  20  10      0   5   0   2   0   2   0   0   0   2
  U  0   0   0   0       5   0   2   0   2   0   0   0   2
  R  0   0   0   0   0       5   0   2   0   0   0   0   0
  Y  0   0   0   0   0   0       2   0   2   0   0   0   0
  M  0   0   0   0   0   0   0       2   0   0   0   0   0
  K  0   0   0   0   0   0   0   0       0   0   0   0   0
  S  0   0   0   0   0   0   0   0   0       2   0   0   0
  W  0   0   0   0   0   0   0   0   0   0       0   0   0
  H  0   0   0   0   0   0   0   0   0   0   0       0   0
  B  0   0   0   0   0   0   0   0   0   0   0   0       0
  V  0   0   0   0   0   0   0   0   0   0   0   0   0
```

INSERTION-DELETIONS :

Lengths: 2
numbers: 2
total weight of history: 0

ALIGNMENT OF SEQUENCES:

LOCAL-FILE-TRANSFER METHOD AND LOCAL-FILED-TRANSFER SYSTEM FOR CLIENT-SERVER SYSTEM

CROSS REFERENCE TO RELATED APPLICATIONS

This application is based upon and claims priority from Japanese Patent Application 8-077939 filed Mar. 29, 1996, the contents of which are incorporated herein by reference herein.

BACKGROUND OF THE INVENTION

1. Field of the Invention

The present invention generally relates to two-way communication systems which transfer information, such as search conditions and search results, between a client and a server in response to requests from the client. Namely, the present invention relates to, for example, a local-file-transfer method and a local-file-transfer system used in a WWW (world wide web) client-server system. The present invention particularly relates to a local-file-transfer method and a local-file-transfer system used in the WWW client-server system which allows large quantities of data to be transferred from a WWW client to a WWW server connected through the Internet.

2. Description of the Related Art

Keeping pace with recent developments of the Internet, WWW client-server systems have been increasing in the number of business application fields in which they can be used. Various execution and search requests issued from a WWW client to a WWW server involve sending large quantities of data, especially in the case where a search request composed by the client and to be sent to the server requires a significant amount of data for its definition. What is needed is a local-file-transfer method and a local-file-transfer system which allow such massive data transfer from the WWW client to the WWW server.

Special types of search request information, such as genetic information, provided by a server device requires a long search-condition clause to be entered at a client device. Such a long data sequence, is generally not suitable for keyboard data entry. What's needed is the ability of storing information in a file in the client device in advance, and transferring the information to the server device at the time of the search, so that the server device can carry out the search for requested information based on the transferred file.

Typically, data transfer from a client device to a WWW server connected through the Internet requires data entry into the client device, and such data entry is typically carried out using the following methods.

A first method of data entry is keyboard entry of the data by an operator working at the WWW client device. The data is entered into an input field on the display which typically displays an HTML (HyperText Markup Language) menu transferred from the WWW server, and, then, the entered data is sent to the WWW server through the Internet.

A second method of data entry is to copy (cut and paste) data to an input field from a window on the same display. In this case, the window shows a list of candidate data for transfer to the WWW server.

The first method of keyboard data entry into the input field is prone to key-touch errors during lengthy data entry, and is also time consuming.

The second method of copying (cutting and pasting) data into the input field from a window on the same display is time consuming in terms of copy-range selection, and, also, is susceptible to possible erroneous character transformation during the copying process.

Accordingly, there is also a need in WWW client-server systems for a local-file-transfer method and a local-file-transfer system which allow massive data transfer from a client to a server without imposing an onerous work load on an operator.

Also, there is a need in the WWW client-server system for a local-file-transfer method and a local-file-transfer system which allow data to be transferred from a client to a server by identifying data on a client display, extracting a relevant file from a client memory device, and sending the relevant file to the server, to request the server to register the file, to execute the file, or to search registered files.

Further, there is a need in the WWW client-server system for a local-file-transfer method and a local-file-transfer system which allow an execution-request transfer from a client to a server to be made by entering the execution request on the client display and sending the request to the server, or by identifying the execution request on the client display, extracting file-stored execution requests from a client memory device, and sending the file to the server.

Moreover, there is a need in the WWW client-server system for a local-file-transfer method and a local-file-transfer system which allow search-condition transfer from a client to a server to be made by entering the search conditions on the client display and sending the search conditions to the server, or by identifying search conditions on the client display, extracting file-stored search conditions from a client memory device, and sending the file to the server.

Also, there is a need in the WWW client-server system for a local-file-transfer method and a local-file-transfer system which can issue a completion message after completion of a data transfer from a client to a server so as to inform the server of the end of the transfer.

Further, there is a need in the WWW client-server system for a local-file-transfer method and a local-file-transfer system which allow a server to store client-sent information, to carry out client-issued requests based on client-registered information provided on a file-unit basis, and to allow the server to notify the client of the execution results.

Moreover, there is a need in the WWW client-server system for a local-file-transfer method and a local-file-transfer system which allow a server to generate search parameters based on client-sent search conditions to search for client-registered information provided on a file-unit basis.

Also, there is a need in the WWW client-server system for a local-file-transfer method and a local-file-transfer system which can request the server to eliminate transferred information when execution results notified by the server are satisfiable.

SUMMARY OF THE INVENTION

Accordingly, it is a general objective of the present invention to provide a local-file-transfer method and a local-file-transfer system which can satisfy the needs described above.

It is another and more specific objective of the present invention to provide a local-file-transfer method and a local-file-transfer system which allow data transfer from a client to a server by identifying data on a client display, extracting a relevant file from a client memory device, and sending the relevant file to the server, in order to request the server to register the file, to execute the file, or to search registered files.

It is a further objective of the present invention to provide a means for preparing lengthy data in advance at the client display and then transferring such data from the client to the server in a way that significantly reduces the user's work load.

In order to achieve the above objects, the present invention provides a method and system of transferring information from a client to a server in a client-server system which achieves significant reduction in operator work load in comparison with conventional keyboard entry. According to the present invention, the data to be transferred to the server is prestored in a file in the memory media of the client. A display is transferred to the client from the server, the display providing fields for entering data. The file in the client's memory media is subsequently entered on the display provided from the server. The file is transferred to the server at the time of search. The server device carries out the search for requested information based on the transferred file data. A search query can be constructed at the client based on combined search conditions made up from search-condition file names and search condition data previously transferred to the server.

Another aspect of the present invention is that a file name of a file is indicated on a display which is created based on menu information provided from the server. After indicating that file-unit-based information is to be registered; and reading the file corresponding to the file name from the memory media, the file is then transferred to the server. The above two steps are carried out when a file extracted from the memory media is transferred from the client to the server.

As another aspect of the present invention, an execution request is identified at the client on the display which is provided from the server, the execution request being made to the server. The execution request can be directly transferred to the server. But when the execution request is longer than a predetermined data length, the execution request is first read from the memory media and then transferred to the server.

As another aspect of the present invention, a search-condition identifier is entered at the client on the display provided from the server. A file is read from the memory media, and transferred to the server. This file stores the search conditions to be transferred to the server and corresponds to the search-condition identifier that was indicated.

As a further aspect of the present invention, a file-transfer-completion message is issued from the client when file transfer to the server is finished.

As a further aspect of the present invention, the server allocates file space for storing the file transferred from the client. The file-unit-based information transferred from the client is stored in the server's file space. A receipt-completion message to the client is issued from the server when all files transferred from the client are received. The server carries out the execution request or search conditions request obtained from the client. Upon completion, the server then sends the execution results or search results to the client.

As a further aspect of the present invention search conditions are entered on the display of the client. This display was previously created based on menu information provided from the server. The search conditions to be used by the server are transferred from the client to the server. Search parameters are generated at the server based on the search conditions obtained from the client. Searching is accomplished at the server based on the generated search parameters for file-unit-based information transferred from the client in advance. The search results are transferred to the client.

As a further aspect of the present invention, an elimination request is sent from the client to the server based on one of the execution results and search results which had been previously sent from the server to the client. A file transferred from the client is then expunged at the server based on the elimination request sent from the client.

In order to achieve the above objectives, the present invention provides a system for transferring information between a client and a server which includes: a local-memory for pre-storing information, the information having a file structure for transfer to the server and a search-condition transfer unit for reading at least one file from the local-memory unit and for transferring this file to the server. The server has a search unit which executes a search based on search conditions contained in this file transferred from the client and transfers the results back to the client.

As a further aspect of the present invention, the search unit of the server has a search-condition storage unit for storing at least one file transferred from the client; and a search-execution unit for transferring search results to the client. The search results are obtained from a search based on combined search conditions made up from at least some of the files stored in the search-condition storage unit.

As a further aspect of the present invention, the search-execution unit includes a search-result transferring unit for transferring search results to the client. The search results are obtained from a search based on combined search conditions made up from at least some of the files and search-condition data transferred from the client.

As a further aspect of the present invention, the system further includes a file-transfer instructing unit, a file indicating unit and a file-transfer unit. The file-transfer instructing unit accepts an entry of data indicating that file-unit-based information is to be transferred. The entry of the data is made on a display which is created based on menu information provided from the server. The file indicating unit accepts at least one file name. The file-transfer unit reads at least one file indicated by the file indicating unit from the local-memory unit and transfers this file to the server.

As a further aspect of the present invention, the client of the system further includes an execution-request instructing unit which accepts an entry of an execution request on the menu information provided from the server. The client also further includes an execution-request-transfer unit which transfers the execution request indicated by the execution-request instructing unit to the server. Alternately, the execution-request-transfer unit reads the execution request indicated by the execution-request instructing unit directly from the local-memory and then transfers the execution request to the server.

As a further aspect of the present invention, the client of the system further includes a search-condition indicating unit which accepts an entry of a search-condition identifier on a display created based on menu information provided from the server. A search-condition-file-transfer unit of the client reads the files from the local-memory unit based on the search-condition identifier indicated by the search-condition indicating unit and transfers the files to the server. A search-condition-transfer unit transfers the search-condition identifier indicated by the search-condition indicating unit to the server.

As a further aspect of the present invention, the client of the system further includes a transfer-completion-message issuing unit for sending a file-transfer-completion message to the server when either the file-transfer unit, the execution-request transfer unit, or the search-condition-file-transfer unit finishes transfer of all files to the server.

As a further aspect of the present invention, the server of the system further includes: an execution-request-storage unit for storing files of execution requests sent from the client and an execution unit for transferring execution results to the client. The execution results are obtained from an execution based on combined execution conditions made up from a plurality of the files of the execution requests stored in the execution-request-storage unit.

As a further aspect of the present invention, the execution unit of the system further includes an execution-results-transfer unit for transferring execution results to the client, the execution results being obtained from an execution based on combined execution conditions made up from the files of the execution requests and execution-request data transferred from the client.

As a further aspect of the present invention, the server of the system further includes a completion-message issuing unit for issuing a receipt-completion message when the server receives all files transferred from the client.

As a further aspect of the present invention, the server of the system further includes a parameter generating unit for generating parameters based on the search conditions obtained from the client. The parameters are used for searching in an information-storage unit of the server. The server includes a search unit for searching in the information-storage unit based on the search parameters generated by the parameter generating unit.

As a further aspect of the present invention, the client of the system further includes an elimination-request issuing unit for sending an elimination request to the server based on one of the execution results and search results which are sent from the server to the client; and an elimination unit for eliminating the files stored in the information-storage unit of the server based on the elimination request sent from the client.

According to the present invention, transfer of lengthy data from the client to the server does not require the operator to make keyboard entry of the data. File-unit-based information corresponding to either data registration, an execution request, or a search request is extracted from the memory unit of the client to be sent to the server. Thus, only key information needs to be entered in order to read desired data from the memory unit. Also, the server device stores the search request sent from the client in the memory unit so as to carry out the search request made by the client at a later stage.

Key information for reading file-unit-based information to be transferred to the server from the client memory unit is entered in a menu display provided by the server using predetermined protocols. Since the file-unit-based information is transferred to the server, keyboard entry of lengthy data is unnecessary.

The execution request itself is entered at the client and subsequently transferred to the server. Alternately, the long-data-length request stored in the local memory unit is read according to the execution request and transferred to the server. In the case of a short data length which imposes no load on the operator, the execution request itself entered on the display can be transferred to the server. Alternately, with a long data length imposing the load on the operator if working manually on the data entry, the file-unit-based information extracted from the local memory unit according to the input execution request (local-memory-means-search key) can be transferred to the server. Namely, a request having a short data length can be transferred to the server without resorting to the extraction of the file-unit-based information from the local memory unit, whereas a request having a long data length can be extracted from the local memory unit to be transferred to the server.

Search conditions entered on the display provided by the server are transferred to the server as long as the search request has a short data length. Alternately, long search conditions stored in the local memory unit are extracted according to the input search conditions and transferred to the server if the search conditions have a long data length. Either one of these two operations can be selected for transfer to the server. Accordingly, simple search conditions are directly transferred to the server, and long and complex search conditions are extracted from the local memory unit to be transferred to the server since the keyboard data entry would impose a heavy load on the operator.

The client sends a file-transfer message to the server when the data transfer from the local memory unit of the client to the server is completed. In response to the file-transfer message, the server executes various requests indicated by the client.

The server stores the files sent from the client, and sends a receipt-completion message to the client after receiving all the files from the client. Then, the server carries out a request from the client, and sends execution results to the client. Based on the execution results from the server, the client can make a decision as to whether to issue a further request, to terminate a request process, or some other operation.

The server generates parameters indicating storage positions of files sent from the client, so that the server can access to the starting positions of the stored files.

When the execution results are sent from the server to the client, the client makes a decision based on the execution results, and sends an elimination request for purging files when there is no further request or when files stored in the server are no longer necessary. In response, the server can eliminate the files indicated by the elimination request, so that the server can avoid a waste of the file storage.

The client reads a file from the local memory unit, and sends it to the server. The server carries out a search based on the search conditions contained in the file, and sends the search results to the client.

Search is conducted based on combined search conditions made up from the search conditions of a plurality of files stored in the search-condition storage means.

The server carries out a search based on combined search conditions made up from both the search conditions of a plurality of stored files and the search-condition data sent from the client.

The client indicates a file transfer operation and a relevant file name so as to transfer a file to the server.

The client transfers to the server an execution request which is entered manually. Alternately, the client reads an indicated execution request from the local memory unit to transfer it to the server. The client transfers to the server search conditions which are entered manually. Alternately, the client reads indicated search conditions from the local memory unit to transfer them to the server.

The client sends a file-transfer-completion message to the server when the file-transfer unit, the execution-request-transfer unit, or the search-condition-file-transfer unit finishes transfer of all the files. In response, the server can start executing a process such as a search process.

The server can carry out execution of a plurality of execution files sent from the client by combining them together.

The server can carry out an execution based on a combined execution request made up from the execution-request data sent from the client and the execution-request files.

The server sends a receipt-completion message to the client when the server has finished receiving all the files transferred from the client.

The server searches for stored files based on parameters generated for the search.

The client makes a decision based on the execution results sent from the server, and sends an elimination request for purging files when there is no further request or when files stored in the server are no longer necessary. In response, the server can eliminate the files indicated by the elimination request, so that the server can avoid a waste of the file storage. A summary of the improved results of the invention are as follows.

A large amount of data transfer from the client to the server is achieved in the WWW client-server system. Search for files sent from the client is conducted based on combined search conditions made up from a plurality of search-condition files.

Search for files sent from the client is conducted based on combined search conditions made up from both the plurality of search-condition files and the search-condition data. Information to be transferred to the server is indicated on a display, and a file extracted from the client memory means according to the indication is transferred to the server.

The execution request such as programs to be executed by the server is entered on the client display, and is transferred to the server. Alternately, the indicated execution request is extracted from the client memory unit, and is transferred to the server.

Search conditions to be used by the server are entered on the display, and are transferred to the server. Alternately, the indicated search conditions are extracted from the client memory unit, and are transferred to the server.

The client sends a completion message to the server when all the transfer from the client to the server is completed, so that the server can know the end of the transfer.

The server can carry out an execution based on combined execution conditions which are made up from a plurality of stored execution files such as those containing programs.

The server can carry out an execution based on combined execution conditions which are made up from both the plurality of stored execution files and the execution-request data.

The server stores information sent from the client and carries out a request from the client based on the stored information and then sends execution results to the client. The server receives search conditions from the client, and generates parameters to be used for a search of the client-sent information based on the search conditions.

When the execution results sent from the server to the client are satisfactory or when files transferred to the server are no longer necessary, the client can make a request to the server to purge the transferred files.

As described above, according to the present invention, the local files indicated at the client device are sent to the server. This way, data registration to the server database through a network such as the Internet or a data-base search at the server device can be readily achieved although registered data or search keywords are lengthy.

Especially, when a search is made through a network for gene arrangements stored in a gene-arrangement data bank, the present invention can achieve significant reductions in the operator's work load and work time compared to conventional keyboard entry of gene-arrangement data up to several kilo bytes.

Other objects and further features of the present invention will be apparent from the following detailed description when read in conjunction with the accompanying drawings.

BRIEF DESCRIPTION OF THE DRAWINGS

FIG. 11 is a diagram showing contents of a directory of a file-storage unit according to the second embodiment;

FIG. 12 is a diagram showing examples of search conditions stored as files according the second embodiment;

FIG. 16 is a diagram showing an example of execution results sent from the server device according to the second embodiment;

DESCRIPTION OF THE PREFERRED EMBODIMENTS

Figure 1:
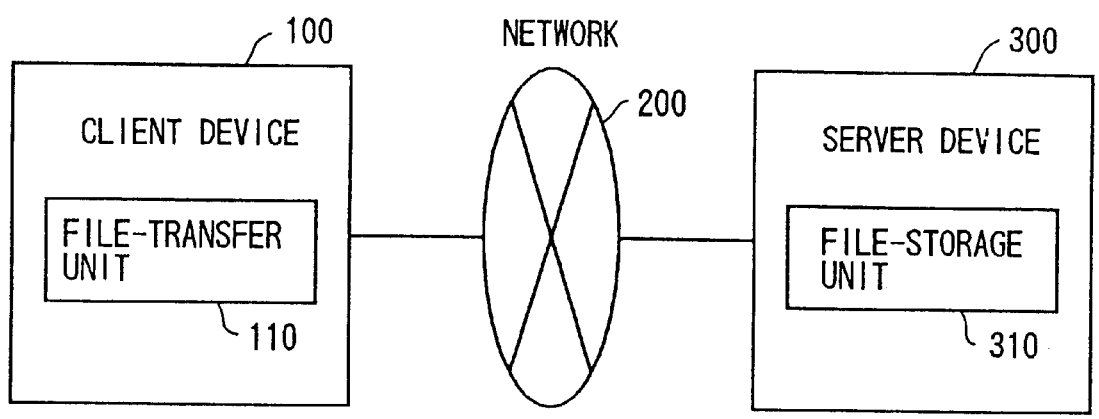
FIG. 1 is a diagram showing a schematic configuration of a system according to the present invention.

FIG. 1 is a diagram showing a schematic configuration of a system according to the present invention. The system of FIG. 1 is a WWW client-server system, and includes a WWW client device 100 (hereinafter referred to as merely a client device), a network 200, and a server device 300 (hereinafter referred to as merely a server device). The client device 100 and the server device 300 are connected via the network 200, an example of which is the Internet. The client device 100 includes a file-transfer unit 110 for transferring files to the server device 300. The server device 300 includes a file-storage unit 310 for storing files transferred from the client device 100.

In the following, a description will be provided with reference to the WWW client-server system. It is apparent, however, that the present invention can be applied to any system in which search conditions are transferred from a client to a server.

Communication between the client device 100 and the server device 300 is based on HTTP protocols.

Figure 2:
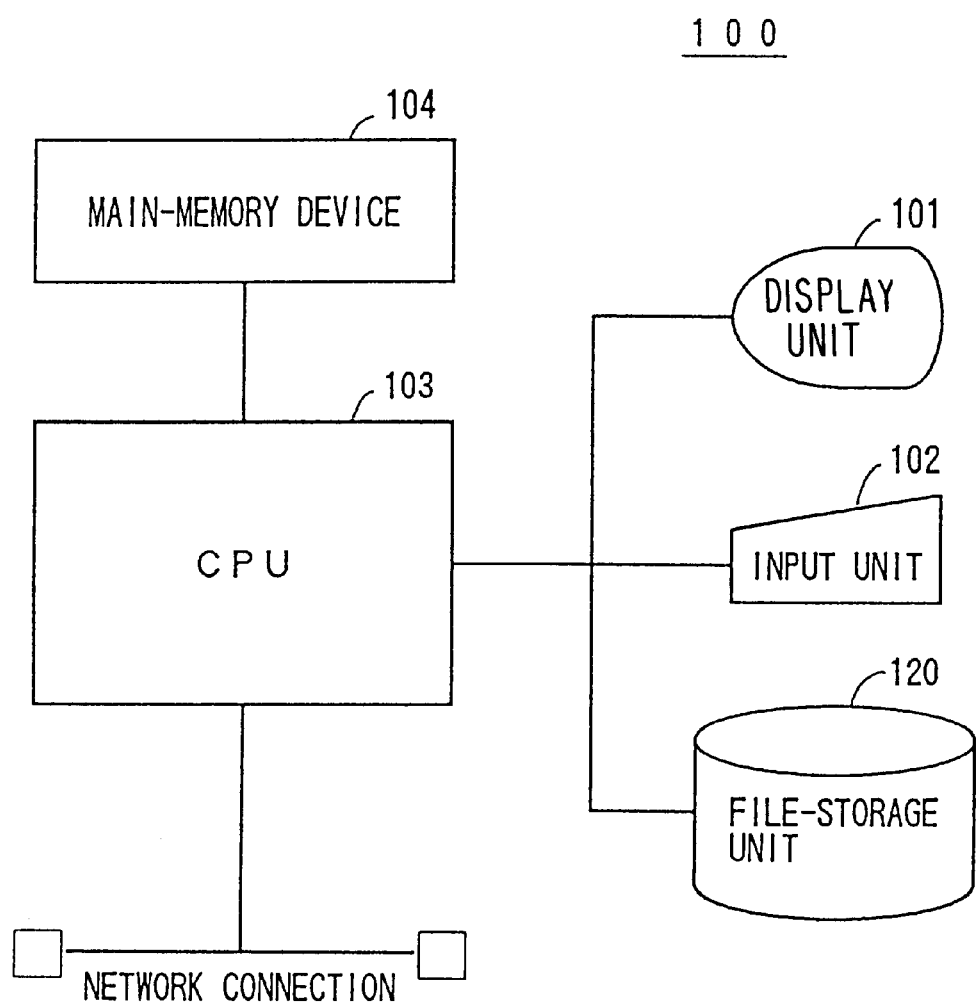
FIG. 2 is a block diagram of a hardware configuration of the client device according to the present invention.

FIG. 2 is a block diagram of the hardware configuration of the client device of FIG. 1. The client device 100 includes a CRT-display device 101, an input device 102 comprising a keyboard and a pointing device such as a mouse, a CPU (central processing unit) 103, a main--memory device 104, and a magnetic disk 120.

The magnetic disk 120 stores files to be transferred to the server device 300.

Figure 3:
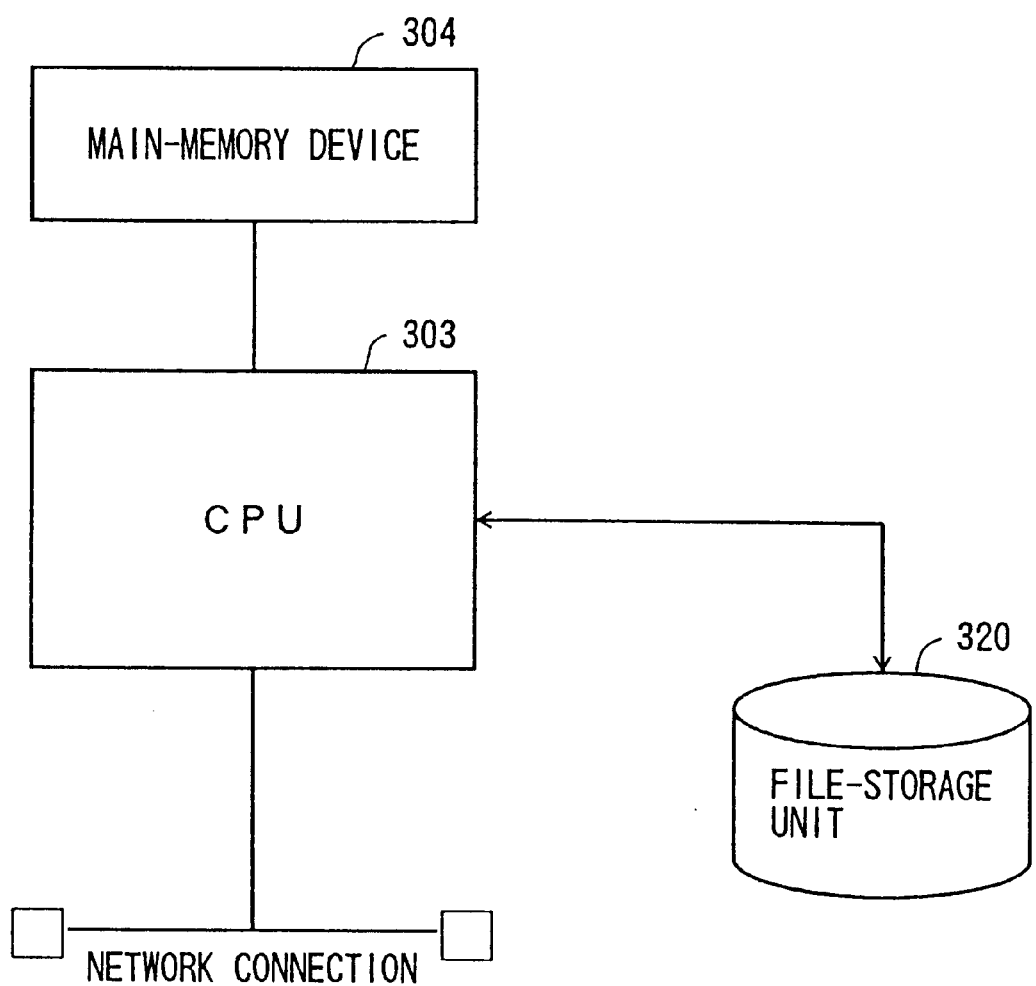
FIG. 3 is a block diagram of a hardware configuration of the server device according to the present invention.

FIG. 3 is a block diagram of the hardware configuration of the server device of FIG. 1. The server device 300 includes a CPU 303, a main-memory device 304, and a magnetic disk 320. The magnetic disk 320 stores files transferred from the client device 100.

Figure 4:
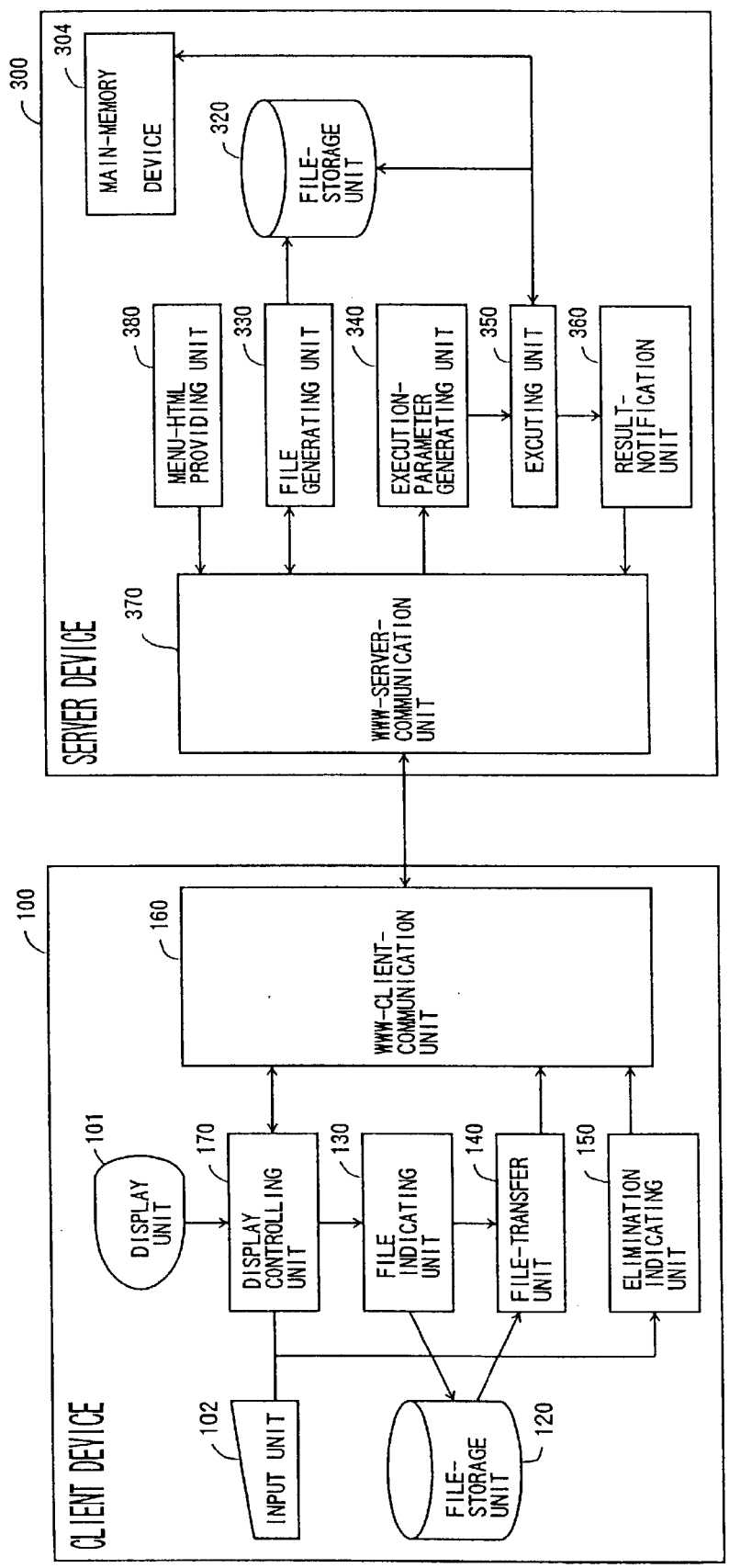
FIG. 4 is a functional block diagram of a file-transfer system according to the present invention.

FIG. 4 is a functional block diagram of a file-transfer system according to the present invention. The client device 100 of FIG. 4 includes the display unit (CRT-display device) 101, the input unit (input device) 102, a display controlling unit 170, the file-storage unit (magnetic disk) 120, a file indicating unit 130, a file-transfer unit 140, an elimination indicating unit 150, and a WWW-client-communication unit 160. The server device 300 of FIG. 4 includes the main-memory device 304, a menu-HTML providing unit 380, the file-storage unit (magnetic disk) 320, a file generating unit 330, an execution-parameter generating unit 340, an executing unit 350, a result-notification unit 360, and a WWW-server-communication unit 370.

In the following, a description of the client device 100 will be provided first.

The display unit 101 of the client device 100 displays an HTML menu sent from the server device 300. Also, the display unit 101 displays input data entered through the input unit 102, and displays execution results and search results obtained from the server device 300 as well as various communication information.

The input unit 102 is used for various entries by an operator for the menu display shown on the display unit 101.

Also, the input unit 102 is used for entries of requests for the server device 300. These entries are made through the keyboard and/or the pointing device of the input unit 102.

The display controlling unit 170 displays, on the display unit 101, screen information, execution results, etc., obtained from the server device 300 via the WWW-client-communication unit 160. Also, the display controlling unit 170 controls the display on the display unit 101 of input data entered through the input unit 102.

The file-storage unit 120 stores files which are to be transferred to the server device 300. These files store data such as search conditions which are too lengthy for keyboard data entry, and are transferred when requests are made from the client device 100 to the server device 300.

The file indicating unit 130 accesses a file stored in the file-storage unit 120 when the operator indicates that file through the input unit 102.

The file-transfer unit 140 reads the file indicated by the file indicating unit 130, and transfers the file to the server device 300 via the WWW-client-communication unit 160.

The elimination indicating unit 150 indicates a file to be purged when the execution results obtained from the server device 300 are satisfactory or when a client-device-transferred file stored in the file-storage unit 320 of the server device 300 is no longer necessary.

The WWW-client-communication unit 160 conducts communication with the server device 300.

In the following, a description of the server device 300 will be given.

The main-memory device 304 of the server device 300 stores information necessary for carrying out requests issued by an operating system thereof or by the client device 100.

The menu-HTML providing unit 380 provides the client device 100 with an HTML-menu display based on a hypertext format. In the present invention, the HTML-menu display includes a process-menu-indication-purpose display, a local-file-indication-purpose display, etc.

The file-storage unit 320 stores files transferred from the client device 100.

The file generating unit 330 allocates file space of the file-storage unit 320 to a file to be transferred based on file structural conditions such as file size, data length, and the like when the client device 100 issues a file-transfer request. Upon receiving the file from the client device 100, the file generating unit 330 issues a file-receipt notification to the client device 100. Also, the file generating unit 330 is responsible for the elimination of a file from the file-storage unit 320 when the client device 100 issues an elimination request.

The execution-parameter generating unit 340 receives an execution request, a search request, etc., from the client device 100, and, then, obtains a file name and a file-start position of a file to be accessed in the file-storage unit 320. The execution-parameter generating unit 340 then passes the file name and the file-start position to the executing unit 350.

Based on a request sent from the client device 100, the executing unit 350 carries out relevant processes by using the execution parameters generated by the execution-parameter generating unit 340.

The result-notification unit 360 obtains execution results when the executing unit 350 finishes an operation thereof, and, then, sends the execution results to the client device 100. The WWW-server-communication unit 370 carries out communication with the client device 100.

In the following, processes between the client device 100 and the server device 300 of the above configuration will be described.

Figure 5:
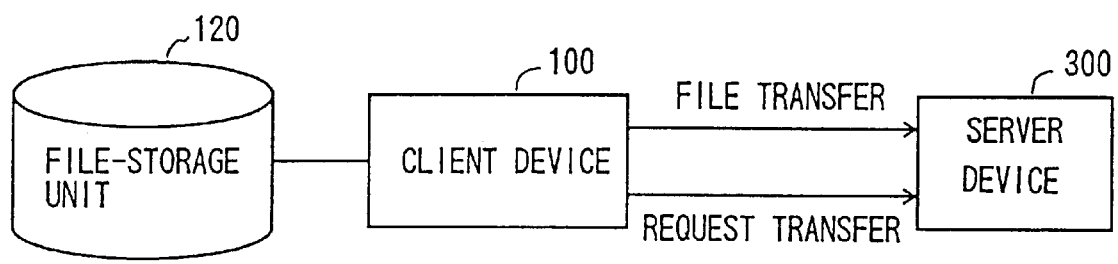
FIG. 5 is a diagram for explaining processes carried out between the client device and the server device according to the present invention.

FIG. 5 is a diagram for explaining processes carried out between the client device and the server device according to the present invention. FIG. 5 shows the flow of transfer of data and requests stored in the file-storage unit 120 when the client device 100 issues a request to the server device 300. In the client device 100, a file name of a file to be transferred is entered through the input unit 102 into the menu display shown on the display unit 101. The file indicating unit 130 obtains position information indicating a position of the file from the file-storage unit 120, and accesses the file-storage unit 120. The file-transfer unit 140 transfers the file, read from the file-storage unit 120, to the server device 300 via the WWW-client-communication unit 160.

In the above operation, the file-storage unit 120 is used for indicating a request such as an execution request or a search request, or is used for indicating a file name. Namely, an indication of a request to be transferred to the server device 300 may be entered, or a file name corresponding to the request may be entered when the request information is lengthy.

In the following, a communication sequence between the client device and the server device will be described.

Figure 6:
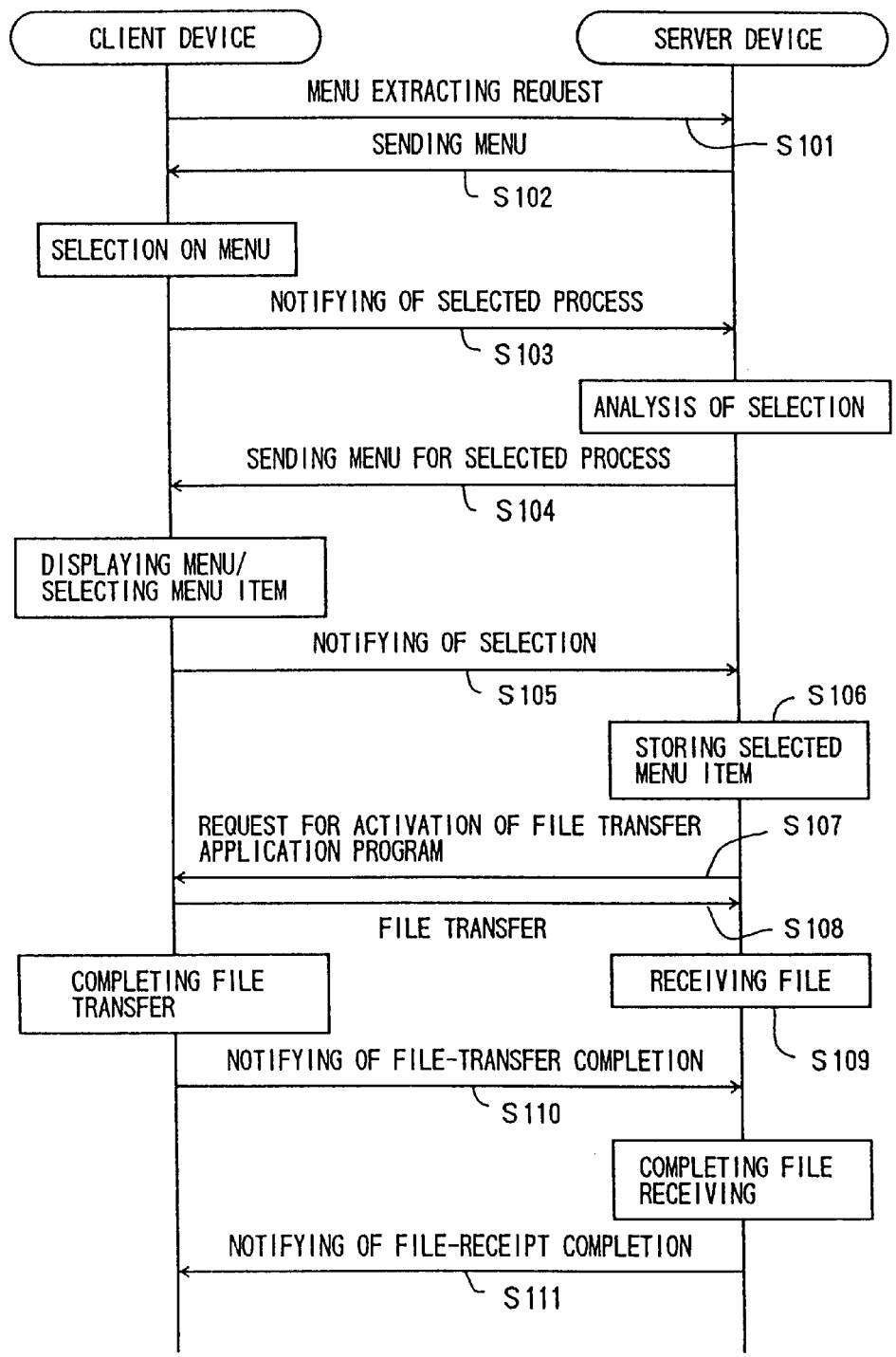
FIG. 6 is a sequence chart of communications between the client device and the server device according to the present invention.

FIG. 6 is a sequence chart of communications between the client device and the server device according to the present invention.

At a step S101, the client device 100 issues a menu extracting request to the server device 300 in response to an activation command given by the input unit 102.

At a step S102, the menu-HTML providing unit 380 of the server device 300 sends the HTML menu, which is to be used for process selection, to the client device 100 issuing the request.

At a step S103, the client device 100 receives the HTML menu from the server device 300, and displays it on the display unit 101 via the display controlling unit 170 for the purpose of process selection. A process is selected from processes on the menu by the input unit 102, and the server device 300 is notified of the selected process.

At a step S104, the menu-HTML providing unit 380 of the server device 300 makes an analysis of the selected process sent from the client device 100, and sends a corresponding process menu to the client device 100. The analysis of the selected process is aimed at identifying the type of the selected process as being file registration, data search, or the like with regard to the server device 300. After the analysis, the HTML menu corresponding to the selected process type is sent to the client device 100 to be used for selection of local files.

At a step S105, the client device 100 displays the local-file-selection menu on the display unit 101 to allow the operator to select a menu item for the file registration or for the data search, and the selected menu item is sent to the server device 300.

At a step S106, the server device 300 stores the selected menu item in the memory, and allocates space for a file to be transferred according to the selected menu item. For example, the server device 300 allocates file space in the magnetic disk or the like.

At a step S107, the server device 300 notifies the client device 100 of a unique data ID as well as the IP address and the port number of the server device 300, and requests the client device 100 to activate a file-transfer application program.

At a step S108, the client device 100 activates the file-transfer application program, and uses the file indicating unit 130 to access the file to be transferred to the server device 300. The file-transfer unit 140 reads the file from the file-storage unit 120, and sends the file to the server device 300 via the WWW-client-communication unit 160 based on the HTTP format.

At a step S109, the server device 300 receives the file from the client device 100, and stores the file in the file space of the file-storage unit 320 allocated at the step S106.

At a step S110, the client device 100 notifies the server device 300 of a file-transfer completion when the file-transfer ends.

At a step S111, the server device 300, having received the file-transfer-completion message, recognizes an end of the file transfer, and informs the client device 100 of the file receipt. If the selected process is a file registration, the procedure ends. If the transferred file is a request for a data search, a search process is carried out, and the execution results are sent to the client device 100.

The above procedure has been described with reference to a case in which a file stored in the file-storage unit 120 of the client device 100 is read out and transferred to the server device 300. As previously noted, however, when the request is an execution request or when the search conditions are not too lengthy for the operator to enter the data, such request or search conditions may be directly entered by the input unit 102 to be transferred to the server device 300.

In the following, embodiments of the present invention will be described with reference to the accompanying drawings.

In the following embodiments, gene-arrangement data is provided as an example for data transfer. The server device 300 corresponds to a gene-arrangement data bank, and the file-storage unit 320 corresponds to a database of the gene-arrangement data bank.

A first embodiment of the present invention is concerned with registration of new gene-arrangement data to the server device 300 from the client device 100. Namely, gene-arrangement data to be newly registered is kept as a file in the file-storage unit 120 of the client device 100, and, then, is registered to the gene-arrangement database (file-storage unit 320) of the server device 300 according to a registration process described below. The registration process of the first embodiment will be described with reference to FIG. 6 which was previously used for explaining the communications between the client device 100 and the server device 300.

At the step S101, the client device 100 issues a request for providing a menu to the server device 300.

Figure 7:
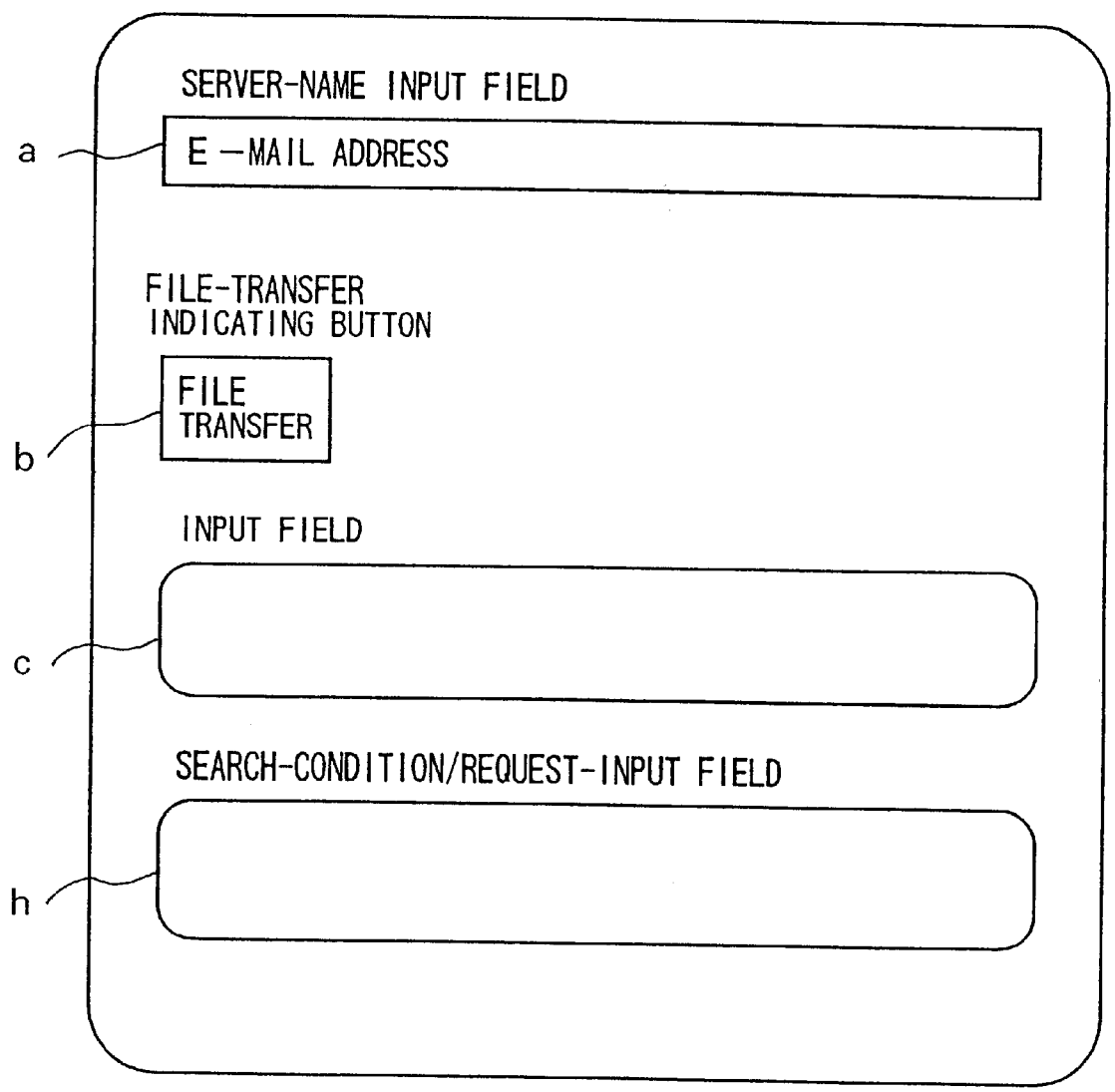
FIG. 7 is a diagram showing an example of a process-selection menu on the client device according to a first embodiment of the present invention.

FIG. 7 is a diagram showing a process selection menu on the display of the client device according to the first embodiment of the present invention.

At the step S102, the process selection menu as shown in FIG. 7 is transferred from the server device 300, and is displayed on the display unit 101 of the client device 100. When a file registration to the server device 300 is carried out by the client device 100, an E-mail address of the server device 300 is entered to a server-name input field a of the process selection menu. Further, a click of a file-transfer indicating button b by the pointing device instructs the file transfer to the server device 300. An input field c is left vacant at the time of the file-transfer request, and is entered with a file name at the time of local-file transfer. When the operator directly indicates a transfer request to the server device by using the input unit 102, only a transfer request is entered into a search-condition/request-input field h.

At the step S103, after data entry to the process selection menu is finished, the display information is transferred through the common gateway interface (CGI) to the server device 300. The menu-HTML providing unit 380 of the server device 300 conducts an analysis of the display information, and learns about a file registration by the client device 100 (file transfer to the server device 300).

Figure 8:
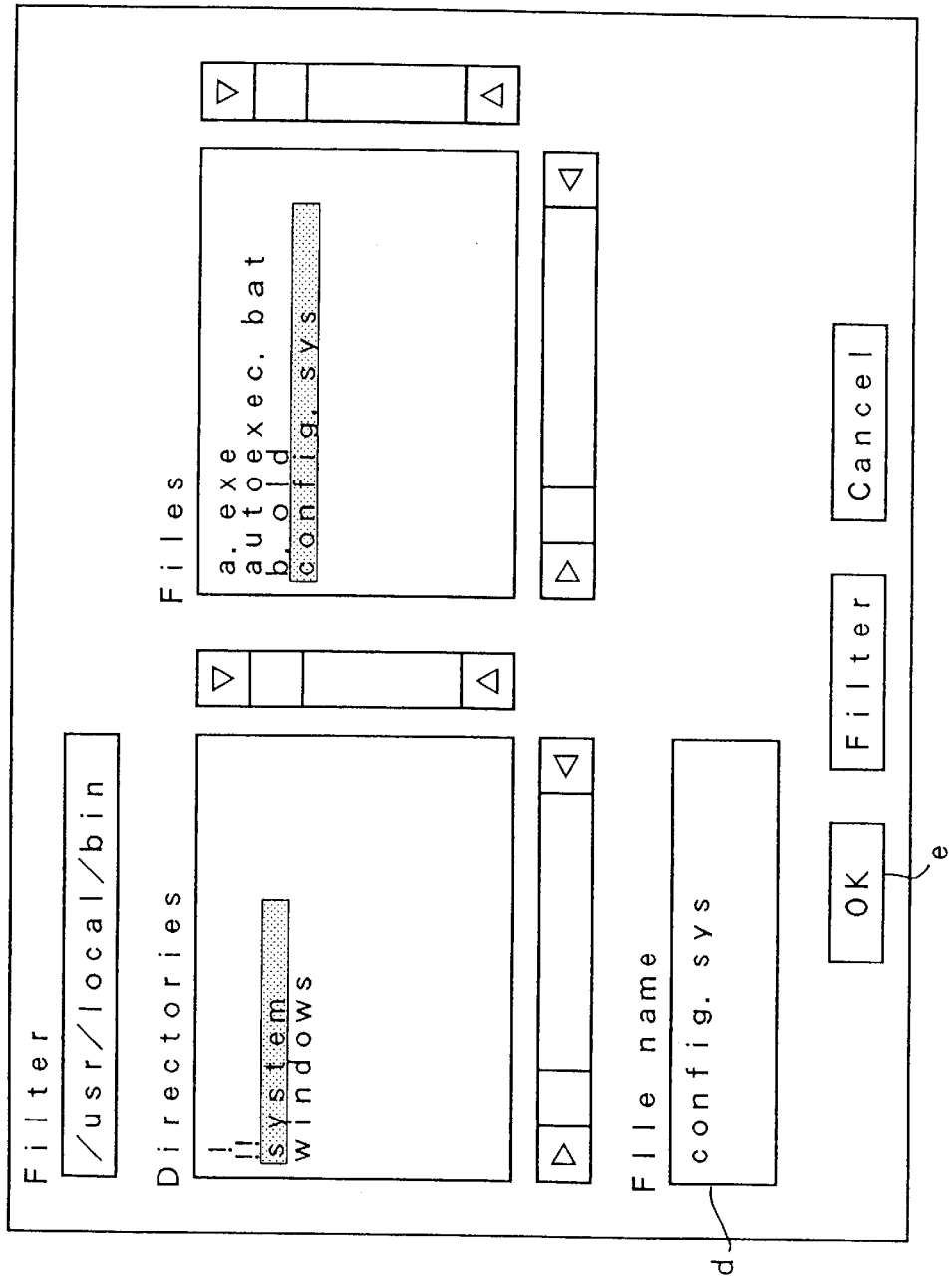
FIG. 8 is a diagram showing an example of a local-file-selection menu according to the first embodiment.

At the step S104, the menu-HTML providing unit 380 of the server device 300 sends a local-file-transfer menu to the client device 100. FIG. 8 is an illustrative drawing showing the local-file-transfer menu.

Upon receiving the local-file-selection menu of FIG. 8 from the server device 300, the client device 100 obtains a directory name of a directory containing a desired file in the file-storage unit 120 and a file name of the desired file through clicks of the respective names by the input unit 102. In the example of FIG. 8, a directory name "system" and a file name "config.sys" are selected, and, thus, the selected file name "config.sys" is shown in a file-name field d. Having confirmed the file name, the operator clicks an OK button e to transfer the file to the server device 300.

At the step S105, the menu-selection information is transferred to the server device 300 via the WWW-client-communication unit 160 of the client device 100.

At the step S106, the server device 300 keeps the selected items in the memory, and the file generating unit 330 of the server device 300 allocates space of the file-storage unit 320 for the file to be transferred.

At the step S107, the server device 300 notifies the client device 100 of a unique data ID as well as the IP address and the port number of the server device 300, and requests the client device 100 to activate a file-transfer application program.

At the step S108, the file indicating unit 130 of the client device 100 activates the file-transfer application program, and accesses the file-storage unit 120 based on the file name "config.sys" selected at the step S105. The file-transfer unit 140 transfers the file (file name "config.sys") obtained from the file-storage unit 120 to the server device 300 via the WWW-client-communication unit 160 based on the HTTP format.

At the step S109, the server device 300 receives the file transferred from the client device 100, and stores the file in the file-storage unit 320.

At the step S110, the client device 100 sends a file-transfer-completion message to the server device 300 when the file-transfer of the file (file name "config.sys") ends.

In the first embodiment described above, the data transfer is conducted for only one file. However, successive transfers of a plurality of files are possible, and a description thereof will be provided in a second embodiment.

At the step S111, the server device 300 receives the file-transfer-completion message to recognize an end of the file transfer, and, then, sends a file-receipt-completion message to the client device 100.

A series of the processes described above enables transfer of a desired file from the client device 100 to the server device 300. If the contents of the file is a program to be subjected to an execution request, a subsequent execution request given by indicating a relevant file name at the client device 100 allows an execution of the program of the file stored in the server device 300. This execution request is entered into the search-condition/request input field h shown in FIG. 7. A search request is issued in the same manner.

In the following, a second embodiment will be described by using an exemplary case in which the client device 100 issues a search request to the server device 300 after issuing a registration request.

In the second embodiment, the client device 100 registers gene-arrangement data to the database (file-storage unit 320) of the gene-arrangement data bank (the server device 300). Then, the client device 100 transfers file-stored search conditions for the gene-arrangement search to the server device 300 so that the server device 300 searches for an analogous gene arrangement.

Figure 9:
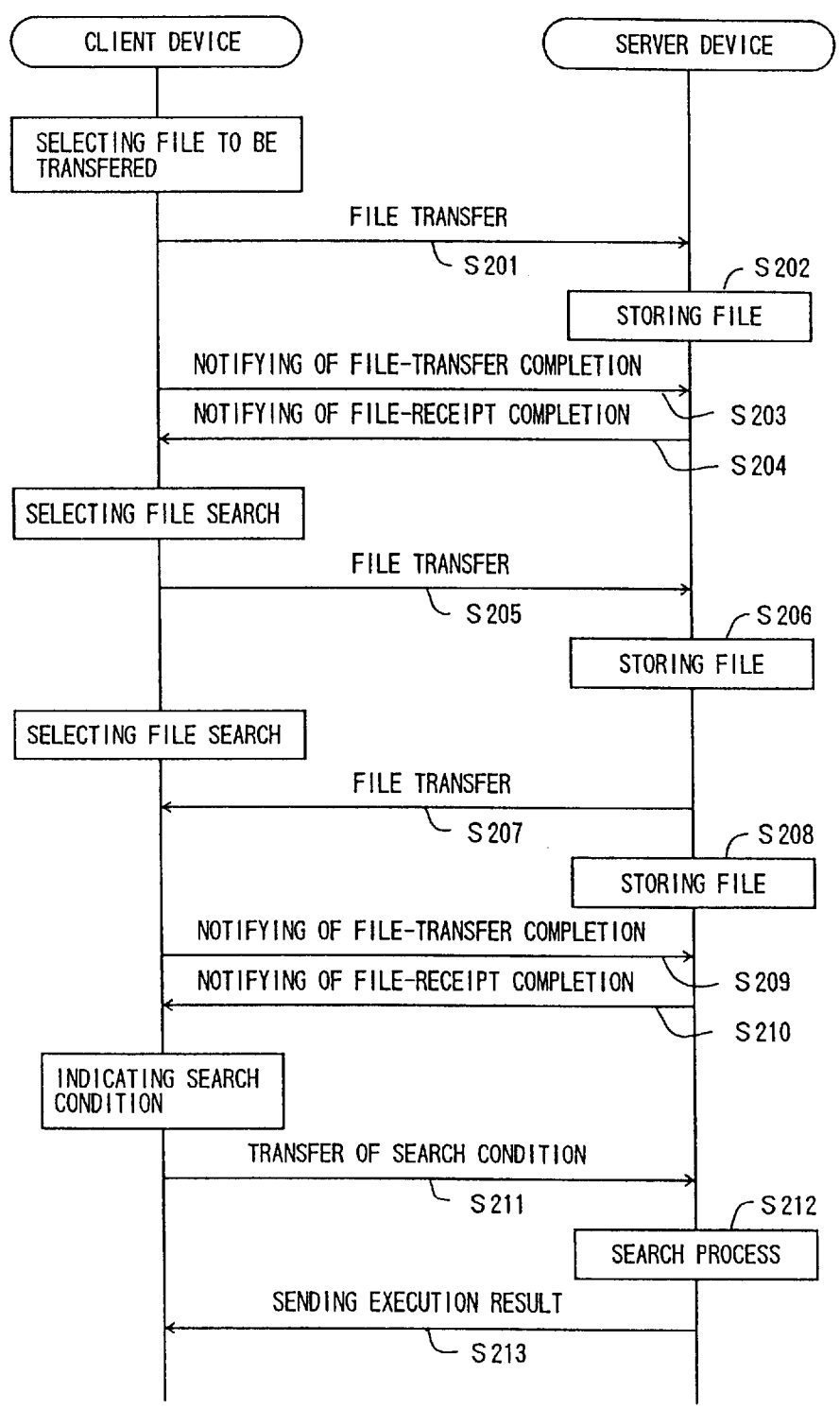
FIG. 9 is a sequence chart showing a file-transfer sequence according to a second embodiment of the present invention.

FIG. 9 is a sequence chart showing a file-transfer sequence according to the second embodiment of the present invention. Operations of the client device 100 and the server device 300 will be described with reference to FIG. 9. In FIG. 9, the HTML-menu transfer from the server device 300 to the client device 100 will be omitted.

Figure 10:
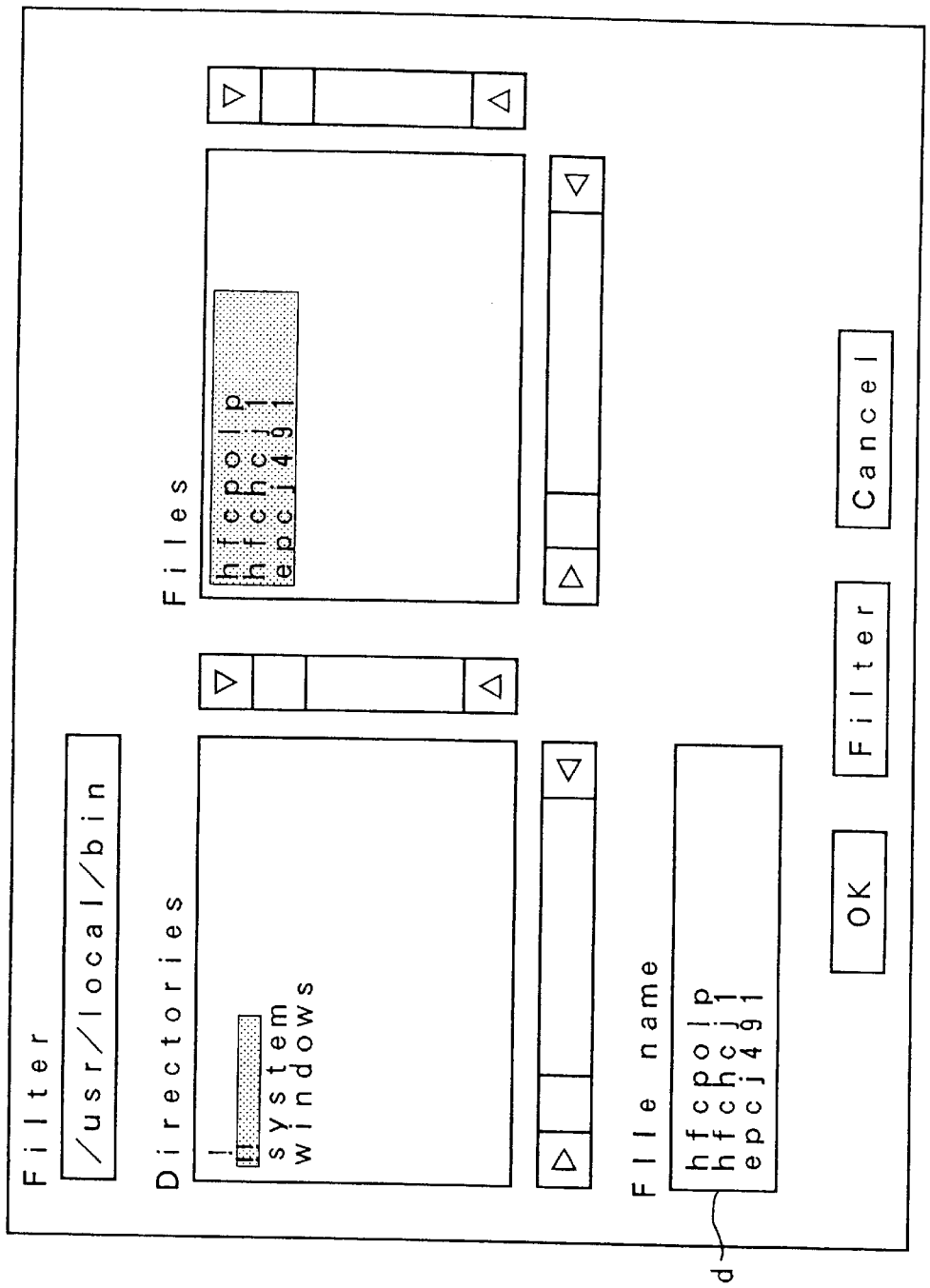
FIG. 10 is a diagram showing an example of a local-file-selection menu according to the second embodiment.

At a step 201, the client device 100 transfers files to the server device 300. FIG. 10 is an illustrative drawing showing an example of a local-file-selection menu. After the client device 100 receives the local-file-selection menu of FIG. 10, a directory "!!" is selected from a list of directory names, and all file names stored in the directory "!!" shown in FIG. 10 are clicked to select these files. Namely, file names "hfcpolp", "hfchcji", and "epcj491" are selected, and a selected-file-name field d shows these three file names. The operator checks these file names, and click the OK button e to transfer these files to the server device 300.

In the same manner as in the first embodiment, the three selected files are read from the file-storage unit 120 and transferred to the server device 300. FIG. 11 is an illustrative drawing showing examples of these files.

At a step S202, the server device 300 stores the files "fcpolp", "hfchcji", and "epcj491" sent from the client device 100 in the file-storage unit 320.

At a step S203, the client device 100 sends a file-transfer-completion message to the server device 300.

At a step S204, the server device 300 having received the file-transfer-completion message issues a file-receipt-completion message.

At a step S205, a search request for the files sent to the server device 300 at the step S201 is entered at the client device 100. FIG. 12 is an illustrative drawing showing examples of search conditions stored as files. The search request is comprised of lengthy search conditions as shown in FIG. 12.

Figure 13:
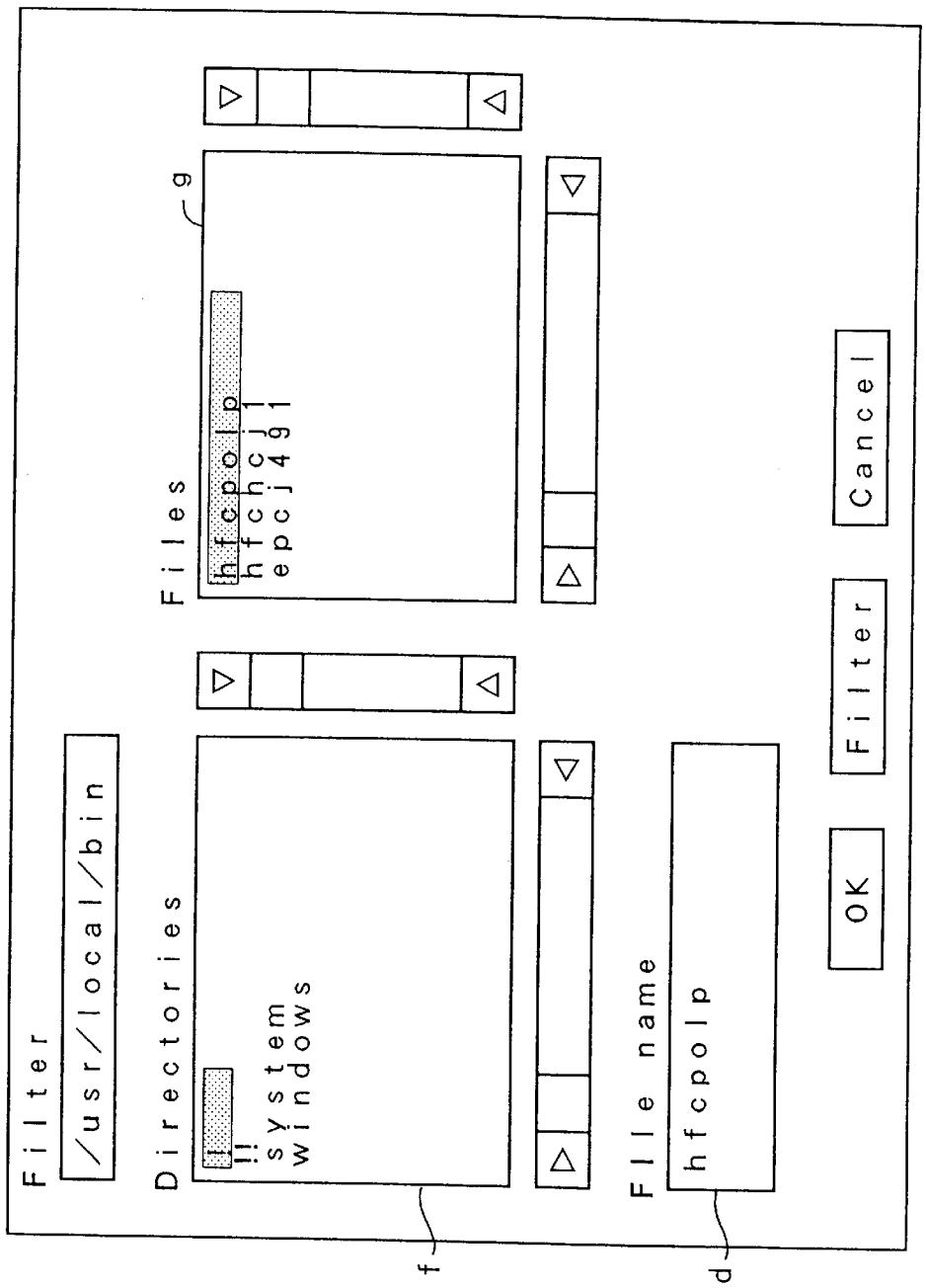
FIG. 13 is a diagram showing a first example of search-condition selection according to the second embodiment.

FIG. 13 is a diagram showing a local-file-selection menu for selecting search conditions. As shown in FIG. 13, the operator selects a directory "!" in a directory-selection field f, and selects a file "hfcpolp" in a file-selection field g to define the search conditions. After these selections, the selected-file-name field d shows the selected file name "hfcpolp". The file indicating unit 130 accesses the directory "!" of the file-storage unit 120, and the file-transfer unit 140 reads the file "hfcpolp" to transfer it to the server device 300.

At a step S206, the server device 300 having received the file "hfcpolp" from the client device 100 stores the transferred file in the file-storage unit 320.

Figure 14:
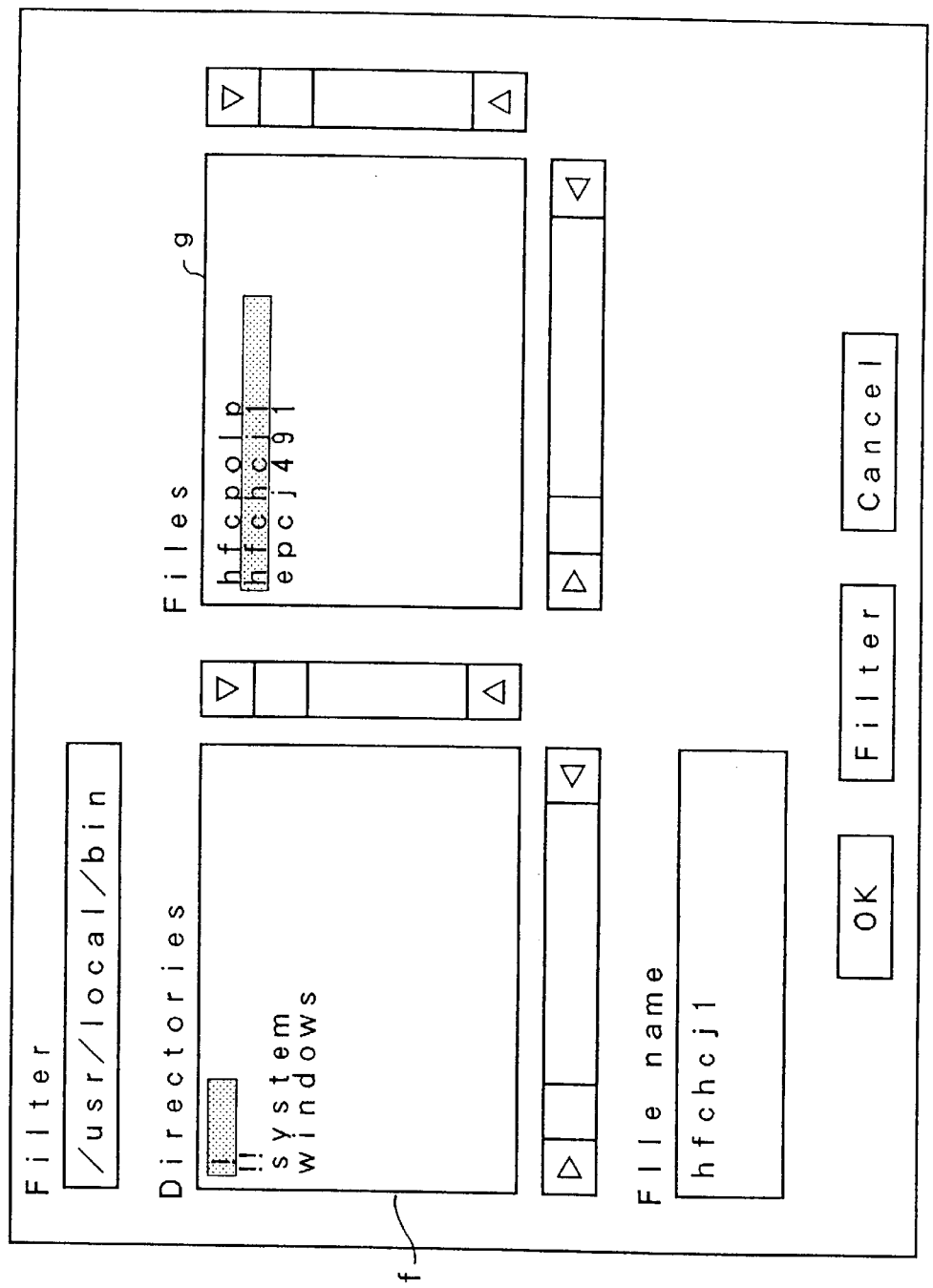
FIG. 14 is a diagram showing a second example of search-condition selection according to the second embodiment.

At a step S207, another search request is made at the client device 100. FIG. 14 is a diagram showing selection of another search conditions. The operator selects the directory "!" again in the directory-selection field f, and selects the file "hfchcj1" in the file-selection field g to define the search conditions. After these selections, the selected-file-name field d shows the selected file name "hfchcj1". The file indicating unit 130 accesses the directory "!" of the file-storage unit 120, and the file-transfer unit 140 reads the file "hfchcj1" to transfer it to the server device 300.

At a step S208, the server device 300 having received the file "hfchcj1" from the client device 100 stores the transferred file in the file-storage unit 320.

At a step S209, the client device 100 sends a file-transfer-completion message to the server device 300.

At a step S210, the server device 300 having receives the file-transfer-completion message issues a file-receipt-completion message.

Figure 15:
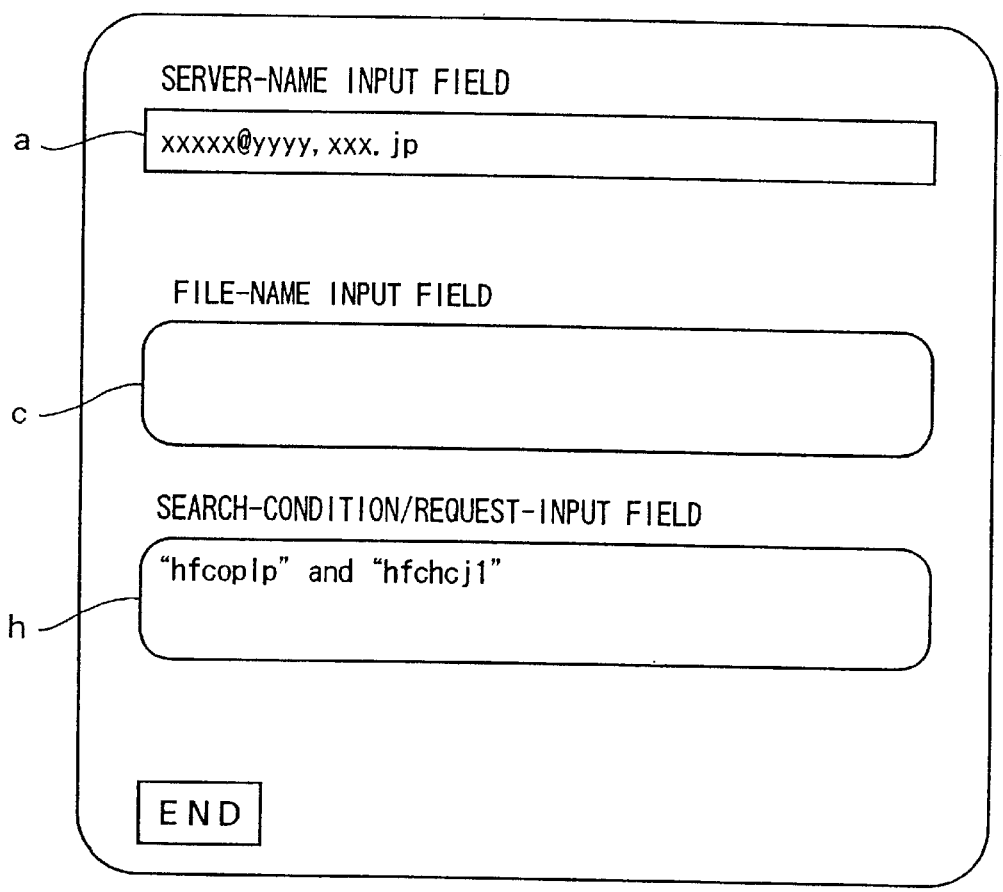
FIG. 15 is a diagram showing an example of a process-selection menu on the client device according to the second embodiment.

At a step S211, a further search condition "hfcoplp AND hfchchj1" is entered at the client device 100. FIG. 15 is an illustrative drawing showing entry of the further search condition. As shown in FIG. 15, the operator enters the E-mail address of the server device 300 into the server-name input field a. In the example of FIG. 15, it is only the selection of search conditions without any file transfer, so that the file-transfer indicating button b of FIG. 7 does not appear on the display. The search condition "hfcoplp AND hfchcj1" is entered in a search-request/request-input field h. The search condition thus entered is transferred to the server device 300. It should be noted that this data transfer is not a file transfer as previously described.

At a step S212, the execution-parameter generating unit 340 of the server device 300 generates parameters for searching in the file-storage unit 320 based on the transferred search conditions. The generated parameters indicate file-start positions of the two files specified in the search condition "hfcoplp AND hfchcj1", and indicate a directory where these files are stored in the file-storage unit 320. The parameters generated by the execution-parameter generating unit 340 are then passed to the executing unit 350. The executing unit 350 accesses the file-storage unit 320 by using these parameters to search the files transferred at the step S202 and stored in the file-storage unit 320 based on the search conditions transferred at the steps S206 and S208 and the further search condition "hfcoplp AND hfchcj1".

At a step S213, execution results obtained after the executing unit 350 of the server device 300 carries out the above search are transferred to the client device 100. FIG. 16 is a diagram showing an example of the execution results.

In this manner, according to the second embodiment of the present invention, the client device 100 transfers data files to the server device 300. Then, the client device 100 transfers file-stored search conditions to the server device 300. Further, the client device 100 transfers a keyboard-entered search condition to the server device 300 to define a relationship between the search conditions stored in different files. Based on the search conditions and the relationship between the search conditions, a search for the data files transferred at the first step is conducted.

In the following, a third embodiment will be described by using an exemplary case in which the client device 100 issues an elimination request to the server device 300 to eliminate client-device-transferred files.

In the third embodiment, when data files or search-condition files stored in the file-storage unit 320 (gene-arrangement database) of the server device 300 (gene-arrangement data bank) by the client device 100 are no longer necessary, indicated files are eliminated from the database to avoid an undesirable increase of used space in the server device 300.

Figure 17:
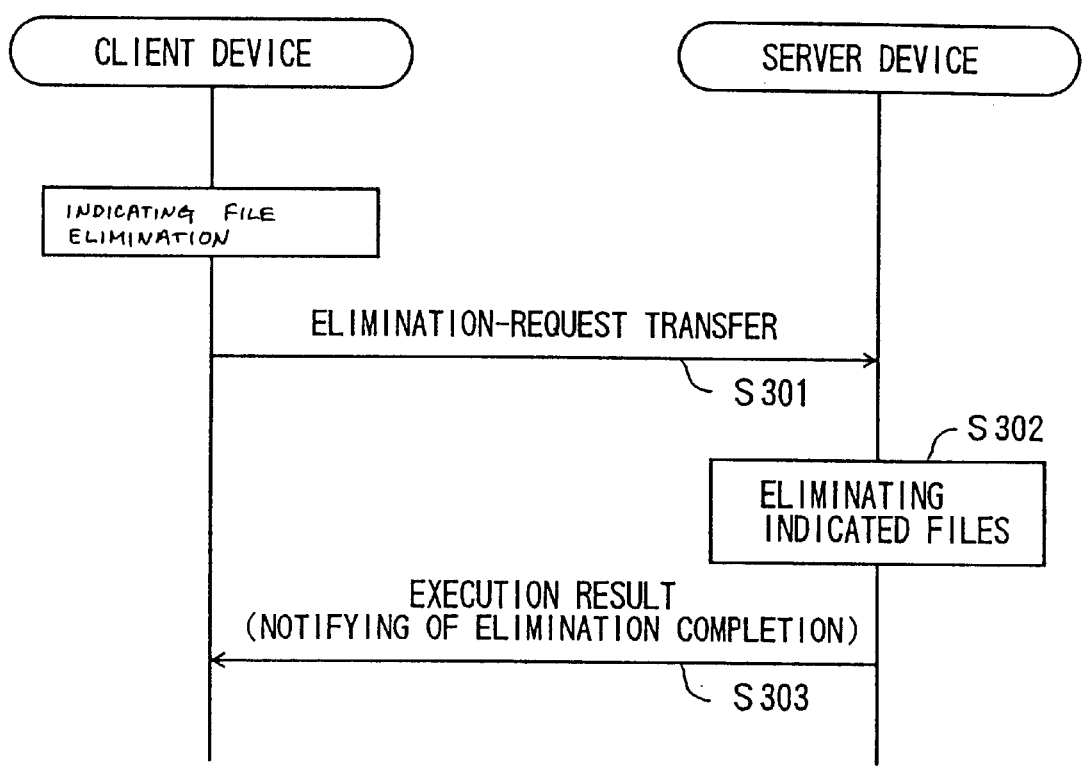
FIG. 17 is a sequence chart of a file-elimination operation according to a third embodiment of the present invention.
Figure 18:
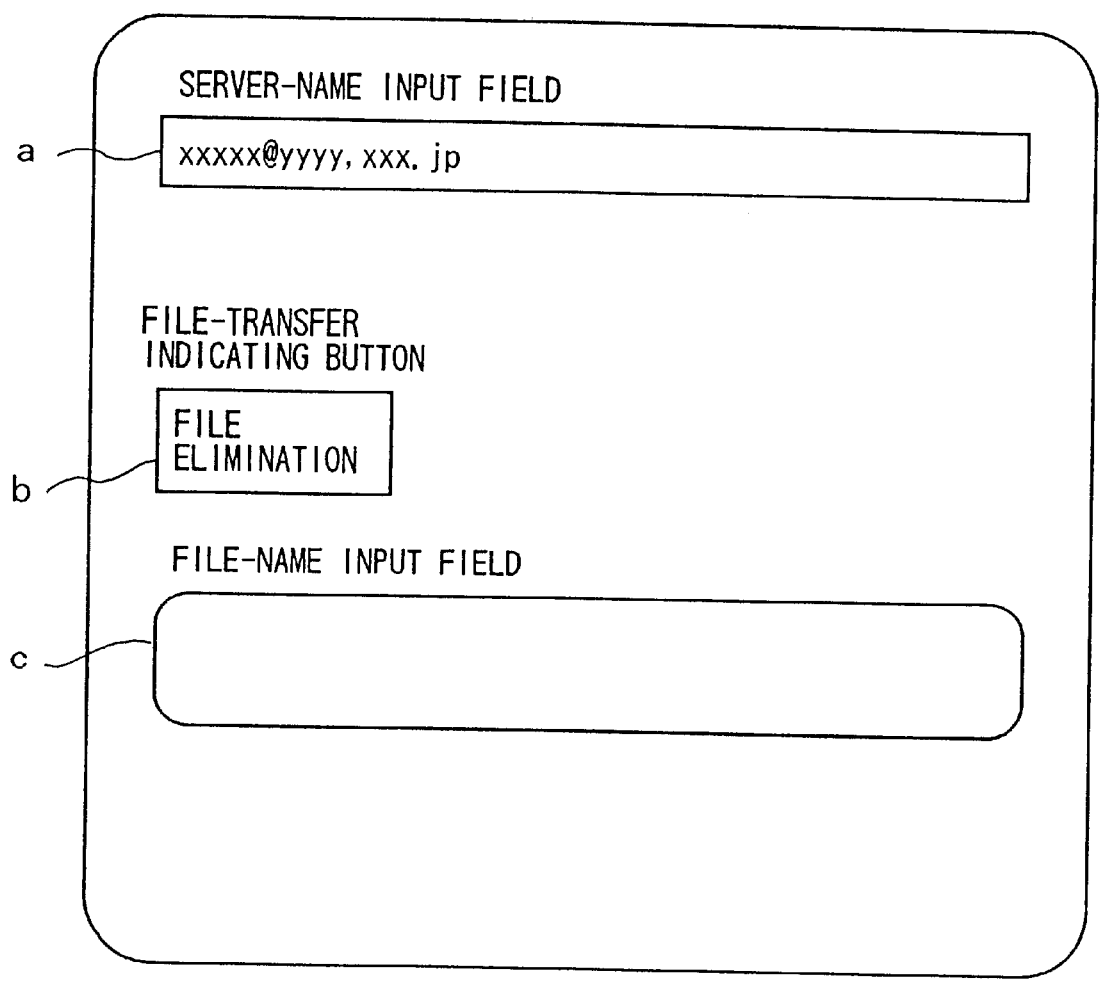
FIG. 18 is a diagram showing a process-selection menu on the client device according to the third embodiment.

FIG. 17 is a sequence chart of a file-elimination operation according to the third embodiment of the present invention. FIG. 18 is a diagram showing a process-selection menu used in the third embodiment.

At a step S301, the client device 100 sends an elimination request to the server device 300. Namely, in the process-selection menu of FIG. 18, the E-mail address of the server device 300 is entered in the server-name input field a, and a file name of a file to be eliminated is entered in the file-name input field c. Then, a file-elimination button b is clicked to send the elimination information to the server device 300.

At a step S302, files indicated by the transferred file names are eliminated in the server device 300. In detail, the server device 300 having received the elimination information, the execution-parameter generating unit 340 of the server device 300 generates parameters based on the file names specified in the elimination information and a directory name containing these files in the file-storage unit 320. These parameters are passed to the executing unit 350. The executing unit 350 accesses the file-storage unit 320 by using these parameters to eliminate the files "hfcoplp" and "hfchch1".

At a step S303, the server device 300 sends a file-elimination-completion message to the client device 100 to indicate that these two files are eliminated.

In this manner, according to the third embodiment of the present invention, some files transferred from the client device 100 to the server device 300 are eliminated by indicating the files which are no longer necessary, so that the storage space of the server device 300 can be spared. The above description has been given with reference to an example in which the unnecessary file names are specified at the client device 100. However, the present invention is not limited to this particular example. For example, file elimination may be conducted at equal intervals at the server device 300, and files without any access for a predetermined period may be eliminated automatically.

As described above, when a search request or an execution request with respect to the gene data is prohibitively long for keyboard data entry, the search request or the execution request stored as files in the file-storage unit 120 of the client device 100 is read out and transferred to the server device 300, so that there is no need to make the keyboard data entry of the request in the input field c of the HTML menu of FIG. 7 transferred from the server device 300. Namely, a displayed menu as shown in FIG. 8, FIG. 13, or FIG. 14 is used for indicating file names and a directory name to send a file-stored execution request and file-stored search conditions to the server device 300. Further, the server device 300 stores the transferred files in the file-storage unit 320 to carry out various processes such as a search process based on the contents of the transferred files.

Further, the present invention is not limited to these embodiments, but variations and modifications may be made without departing from the scope of the present invention.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of transferring information between a World Wide Web (WWW) client and a WWW server in a WWW client-server system, the WWW server connected to a database, said method comprising:

storing data to be transferred to said WWW server in memory media of said WWW client;

at a computer hosting the WWW client, initially creating and storing a local file of the computer, the local file containing a literal query search term;

interactively indicating on a display of said WWW client the local file, said local file containing the literal query search term stored in said memory media;

responsive to the indicating the local file, transferring said local file from said memory media to said WWW server and storing the received file at the WWW server;

after the transferring, entering a search request including a reference to the literal search term in a search request screen displayed at the WWW client and receiving the search request at the WWW server; and in response to the search request, recognizing the reference and executing a search operation searching the database for the literal query search term on said WWW server by the WWW server reading said file received from said WWW client and stored at the WWW server, and returning a search result for display at the web client.

2. The method as claimed in claim 1, wherein said transferring comprises:

generating the display on said WWW client based on menu information provided from said WWW server and file information obtained from said WWW client;

indicating a file name of said file to be transferred on said display;

reading said file corresponding to the file name from said memory media; and transferring said file to said WWW server.

3. The method as claimed in claim 2, further comprising issuing a file-transfer-completion message from said WWW client when file transfer to said WWW server is finished.

4. The method as claimed in claim 2, further comprising:

allocating, at said WWW server, file space for storing said file transferred from said WWW client;

storing, in said file space at said WWW server, file-unit-based information transferred from said WWW client;

issuing, from said WWW server, a receipt-completion message to said WWW client when all files transferred from said WWW client are received;

executing at said WWW server search operations based on the search control information in said file received from said WWW client; and sending from said WWW server results of the search operations to said WWW client.

5. The method as claimed in claim 1, wherein said file further includes an execution request, wherein said method further comprises identifying a representation of the execution request at said WWW client on said display which is provided from said WWW server, and wherein said transferring includes transferring the execution request to said WWW server, by reading said file containing the execution request from said memory media when said execution request is longer than a predetermined data length.

6. The method as claimed in claim 5, further comprising issuing a file-transfer-completion message from said WWW client when file transfer to said WWW server is finished.

7. The method as claimed in claim 5, further comprising:

allocating, at said WWW server, file space for storing a file transferred from said WWW client;

storing, at said WWW server, said file-unit-based information transferred from said WWW client in said file space;

issuing, from said WWW server, a receipt-completion message to said WWW client when all files transferred from said WWW client are received;

carrying out, at said WWW server, said execution request or search conditions obtained from said WWW client; and sending, from said WWW server, execution results or search results to said WWW client.

8. The method as claimed in claim 1, further comprising:
generating said display at said WWW client, based on data received from said WWW server; and
indicating at said WWW client a search-condition identifier corresponding to said file, and wherein said transferring includes reading said file from said memory media corresponding to the search-condition identifier.

9. The method as claimed in claim 8, further comprising issuing a file-transfer-completion message from said WWW client when file transfer to said WWW server is finished.

10. The method as claimed in claim 8, further comprising:

allocating, at said WWW server, file space for storing a file transferred from said WWW client;

storing, at said WWW server, said file-unit-based information transferred from said WWW client in said file space;

issuing, from said WWW server, a receipt-completion message to said WWW client when all files transferred from said WWW client are received;

executing at said WWW server search operations based on the search control information in said file received from said WWW client; and sending, from said WWW server, execution results or search results to said WWW client.

11. The method as claimed in claim 1, further comprising:

allocating, at said WWW server, file space for storing a plurality of files transferred from said WWW client;

storing, in said file space at said WWW server, file-unit-based information transferred from said WWW client;

issuing, from said WWW server, a receipt-completion message to said WWW client when all of said files transferred from said WWW client have been received;

executing at said WWW server search operations based on combining the search control information in said files received from said WWW client; and sending from said WWW server results of the search operations to said WWW client.

12. The method as claimed in claim 1, further comprising:

entering, at said WWW client, search conditions on said display which is created based on menu information provided from said WWW server;

storing the search conditions in said file;

generating, at said WWW server, search parameters based on the search conditions in said file received from said WWW client;

searching, based on the search parameters at said WWW server, for file-unit-based information transferred from said WWW client in advance; and transferring search results from said WWW server to said WWW client.

13. The method as claimed in claim 1, further comprising:

sending an elimination request from said WWW client to said WWW server based on search results sent from said WWW server to said WWW client; and eliminating, at said WWW server, an identified file transferred from said WWW client based on said elimination request sent from said WWW client.

14. A system for transferring information, comprising:

a WWW client device, including
a local memory to store information having a file structure; and a search-condition transfer unit, coupled to said local memory, to read at least one file from said local memory and to output said at least one file from said WWW client device; and a WWW server device connected to a database, connectable to said WWW client device, including a communication unit to receive said at least one file from said WWW client device;

a storage unit storing the received at least one file; and a search unit, coupled to said communication unit, to transfer search results to said WWW client device, said search results being obtained by the WWW server reading a literal search term from said at least one file stored at said WWW server device and searching the database for such read literal search term, the searching in response to a search request from the WWW client device.

15. The system as claimed in claim 14, wherein said search unit comprises:

a search-condition storage unit to store at least two files transferred from said WWW client; and a search-execution unit, coupled to said search-condition storage unit, to transfer said search results to said WWW client, said search results being obtained from a search based on combined search conditions made up from the at least two files received from said WWW client and stored in said search-condition storage unit.

16. The system as claimed in claim 15, wherein said search-execution unit comprises a search-result transferring unit transferring search results to said WWW client, said search results being obtained from a search based on the combined search conditions made up from the at least two files and search-condition data transferred from said WWW client separately from the files stored in said local memory.

17. The system as claimed in claim 14, wherein said WWW client further comprises:

a file-transfer instructing unit to allow entry of data indicating that file-unit-based information is to be transferred, said entry of said data being made using a display which is created based on menu information provided from said WWW server;

a file indicating unit to allow indication of at least one file name; and a file-transfer unit to read at least one file indicated by said file indicating unit from said local-memory and transferring said at least one file to said WWW server.

18. The system as claimed in claim 17, wherein said WWW client further comprises a transfer-completion-message issuing unit sending a file-transfer-completion message to said WWW server when one of said file-transfer units, said execution-request transfer units, and said search-condition-file-transfer units finishes transfer of all files to said WWW server.

19. The system as claimed in claim 14, wherein said WWW client further comprises:

an execution-request instructing unit allowing entry of an execution request on said menu information which is provided from said WWW server and displayed on a display; and an execution-request-transfer unit transferring said execution request indicated by said execution-request instructing unit to said WWW server, and alternatively reading said execution request indicated by said execution-request instructing unit from said local-memory to transfer said execution request to said WWW server.

20. The system as claimed in claim 19, wherein said WWW client further comprises a transfer-completion-message issuing unit sending a file-transfer-completion message to said WWW server when one of said file-transfer units, said execution-request transfer unit, and said search-condition-file-transfer unit finishes transfer of all files to said WWW server.

21. The system as claimed in claim 14, wherein said WWW client further comprises:

a search-condition indicating unit allowing entry of a search-condition identifier on a display which is created based on menu information provided from said WWW server;

a search-condition-file-transfer unit reading said at least one file from said local-memory means based on said search-condition identifier indicated by said search-condition indicating unit and transferring said at least one file to said WWW server; and a search-condition-transfer unit transferring said search-condition identifier indicated by said search-condition indicating unit to said WWW server.

22. The system as claimed in claim 21, wherein said WWW client further comprises a transfer-completion-message issuing unit sending a file-transfer-completion message to said WWW server when one of said file-transfer units, said execution-request transfer units, and said search-condition-file-transfer units finishes transfer of all files to said WWW server.

23. The system as claimed in claim 14, wherein said WWW server further comprises:

an execution-request-storage unit storing files of execution requests sent from said WWW client; and an execution unit transferring execution results to said WWW client, said execution results being obtained from an execution based on combined execution conditions made up from a plurality of said files of said execution requests stored in said execution-request-storage unit.

24. The system as claimed in claim 23, wherein said execution unit further comprises an execution-results-transfer unit transferring execution results to said WWW client, said execution results being obtained from an execution based on combined execution conditions made up from said files of said execution requests and execution-request data transferred from said WWW client.

25. The system as claimed in claim 14, wherein said WWW server further comprises a completion-message issuing unit issuing a receipt-completion message when said WWW server receives all files transferred from said WWW client.

26. The system as claimed in claim 14, wherein said WWW server further comprises:

a parameter generating unit generating parameters based on said search conditions obtained from said WWW client, said parameters being used for searching in said information-storage unit; and a search unit searching in said information-storage means based on said search parameters generated by said parameter generating unit.

27. The system as claimed in claim 14, wherein said WWW client further comprises:

an elimination-request issuing unit sending an elimination request to said WWW server based on one of execution results and search results which are sent from said WWW server to said WWW client; and an elimination unit eliminating said files stored in said information-storage unit based on said elimination request sent from said WWW client.

28. A method of transferring information between a WWW client and a WWW server in a WWW client-server system, said method comprising:
  initially creating and storing condition files in a storage of said WWW client, said condition files containing search conditions to be used by said WWW server to carry out a search in a storage of said WWW server;
  interactively indicating at least one condition file on a display of said WWW client;
  extracting said at least one condition file among said condition files from said storage of said WWW client;
  responsive to the indicating the at least one condition file, transferring said at least one condition file from said WWW client to said WWW server;
  storing the transferred at least one condition file at the WWW server; and
  in response to a search request from the WWW client that references the search condition in the file stored at the WWW server, searching for data files stored in said storage of said WWW server by the WWW server using as a literal search term said search conditions contained in said at least one condition file stored at the WWW server.

29. The method as claimed in claim 28, further comprising:
  entering a further search condition on said display of said WWW client, said further search condition defining a combination of said search conditions between said condition files when a plurality of said condition files are transferred as said at least one condition file; and
  transferring said further search condition from said WWW server to said WWW client, and
  wherein said searching comprises searching for said data files by using said search conditions combined with said further search condition.

30. The method as claimed in claim 28, further comprising transferring a data file from said WWW client to said WWW server device to store said data file as one of said data files in said storage of said WWW server.

31. A method of communicating a search request from a WWW client to a WWW server in a WWW client-server system, said method comprising:
  transferring a plurality of files initially created and stored at the WWW client from the WWW client to the WWW server, wherein each file contains a literal search term, and the plurality of files are then stored in a storage media at the WWW server;
  after transferring one or more of the files, transferring instructions for a search query from the WWW client to the WWW server where the search query includes a reference to a literal search term stored in a transferred file, and based on the instructions, composing at the WWW server a search query by recognizing the reference and then obtaining the literal search term from the corresponding one of the plurality of files transferred to and stored at the WWW server and new search condition data included in the instructions; then
  executing a search at the WWW server according to the search query, where the literal search term is searched for; and
  returning results of the search to the WWW client.

32. The method of claim 31, wherein the search-condition is a gene-arrangement pattern for searching a gene-arrangement database located at the WWW server.

33. A method of searching in a WWW client-server system, comprising:
  initially creating and storing in a memory or storage of a WWW client at least one local condition file, each local condition file containing a search condition;
  after creating and storing at least one of the local condition files, requesting by said WWW client a selection menu from a WWW server;
  sending the selection menu to said WWW client by said WWW server;
  designating a file name of one of the local condition files from the menu provided by said WWW server;
  transferring the local condition file corresponding to the designated file name to said WWW server; then
  storing the transferred condition files at said WWW server;
  after the storing of the at least one transferred condition file, entering, at said WWW client, search condition data into a search menu provided by said WWW server, where the search conditions comprise a reference to the search condition in the at least one condition file transferred to and stored at the WWW server;
  transferring from said WWW client to said WWW server instructions for a search query based on the search condition data;
  combining stored search condition data in the at least one of the condition files stored at said WWW server with the new search condition data to perform the search query;
  executing a search based on the search query; and
  transferring search results of the search to said WWW client.

34. a method for querying a web server from a web client separate from the web server, comprising:
  including in a query statement entered at the web client a reference identifying a file to be used by the web server for executing the query statement;
  expanding the query statement at the web server by replacing the reference in the query statement with query information in the referenced file stored at the web server; and
  executing the expanded query statement at the web server, where the query information in the query statement is used as a literal search term.

35. A method for querying a WWW server from a WWW client separate from the WWW server, comprising:
  initially creating and storing a literal search string at the WWW client;
  sending the literal search string from the WWW client to the WWW server;
  responsive to the sending, storing the literal search string at the WWW server;
  after the storing at the WWW server, forming a query request at the WWW client by including in the query request a reference to the literal search string;
  after the forming, sending the query request to the WWW server; and
  performing a query at the WWW server based on the query request, by recognizing the reference to the literal search term and, accessing the literal search string stored at the WWW server responsive to the reference in the query request, and searching for the literal search string at the WWW server.

36. A method for querying a WWW server from a WWW client separate from the WWW server, comprising:

creating literal search terms at the WWW client;

after the creating, receiving from the WWW client and then storing the literal search terms at the WWW server, where the literal search terms have a length rendering them impracticable for manual entry; and after the storing, performing searches at the WWW server using the stored literal search terms as query search terms, responsive to search requests from the WWW client that include references identifying the stored literal search terms, recognizing the references to the literal search terms and then using the referred-to stored literal search terms to search for the literal search terms at the WWW server.

37. A method for querying a WWW server from a WWW client separate from the WWW server, comprising:

initially creating, storing, and sending a file containing a literal search term from the WWW client to the WWW server and in response storing the sent file at the WWW server;

sending from the WWW client to the WWW server a search request, where the search request is sent separately from and after the file; and searching for the literal search term at the WWW server by recognizing a reference to the literal search term in the search request sent from the client, and dereferencing the reference to search for the literal search term stored at the WWW server.

38. A method for querying a web server from a web client separate from the web server, the method comprising:

interactively initially creating and storing, at the web client, a string and an identifier associated with and identifying the string;

after the creating and storing, transmitting the string and the identifier from the web client to the web server and in response storing the string and identifier at the web server;

receiving a search form at the web client from the web server and displaying the search form with the web client;

interactively specifying the identifier with the search form;

submitting the search form and the specified identifier from the web client to the web server;

receiving the submitted form at the web server, and in response generating a query statement by recognizing the specified identifier and using it to identify the literal search term, and by using the string stored at the web server and identified by the identifier as a literal search term in the query statement; and executing the query statement at the web server and returning a search result to the web client.

\* \* \* \* \*

UNITED STATES PATENT AND TRADEMARK OFFICE
CERTIFICATE OF CORRECTION

PATENT NO. : 6,725,251 B2
DATED : April 20, 2004
INVENTOR(S) : Tatsuya Ito

It is certified that error appears in the above-identified patent and that said Letters Patent is hereby corrected as shown below:

Column 22,
Line 34, change "a" to -- A --.

Column 24,
Line 21, change the second occurrence of "the" to -- a --.
Line 23, change "a" to -- the --.

Signed and Sealed this

Second Day of November, 2004

JON W. DUDAS
*Director of the United States Patent and Trademark Office*